Jan. 15, 1963 H. W. RUBINSTEIN ET AL 3,073,007

METHOD AND MEANS FOR ASSEMBLING CAPACITORS

Filed Sept. 29, 1958 13 Sheets-Sheet 1

INVENTORS
HARRY W. RUBINSTEIN
SIDNEY B. WILLIAMS
BY
Connolly and Hutz
ATTORNEYS

INVENTORS
HARRY W. RUBINSTEIN
SIDNEY B. WILLIAMS
BY
Connolly and Hutz
ATTORNEYS

METHOD AND MEANS FOR ASSEMBLING CAPACITORS

INVENTORS
HARRY W. RUBINSTEIN
SIDNEY B. WILLIAMS
BY
Connolly and Hutz
ATTORNEYS

METHOD AND MEANS FOR ASSEMBLING CAPACITORS

Filed Sept. 29, 1958 13 Sheets-Sheet 4

INVENTORS
HARRY W. RUBINSTEIN
SIDNEY B. WILLIAMS
BY
Connolly and Hutz
ATTORNEYS

METHOD AND MEANS FOR ASSEMBLING CAPACITORS

INVENTORS
HARRY W. RUBINSTEIN
SIDNEY B. WILLIAMS
BY
Connolly and Hutz
ATTORNEYS

Jan. 15, 1963 H. W. RUBINSTEIN ET AL 3,073,007

METHOD AND MEANS FOR ASSEMBLING CAPACITORS

Filed Sept. 29, 1958 13 Sheets-Sheet 6

INVENTORS
HARRY W. RUBINSTEIN
SIDNEY B. WILLIAMS
BY
Connolly and Hutz
ATTORNEYS

METHOD AND MEANS FOR ASSEMBLING CAPACITORS

INVENTORS
HARRY W. RUBINSTEIN
SIDNEY B. WILLIAMS
BY
Connolly and Hutz
ATTORNEYS

INVENTORS
HARRY W. RUBINSTEIN
SIDNEY B. WILLIAMS
BY
Connolly and Hutz
ATTORNEYS

INVENTORS
HARRY W. RUBINSTEIN
SIDNEY B. WILLIAMS
BY
Connolly and Hutz
ATTORNEYS

METHOD AND MEANS FOR ASSEMBLING CAPACITORS

Filed Sept. 29, 1958 13 Sheets-Sheet 10

INVENTORS
HARRY W. RUBINSTEIN
SIDNEY B. WILLIAMS
BY
Connolly and Hutz
ATTORNEYS

METHOD AND MEANS FOR ASSEMBLING CAPACITORS

Filed Sept. 29, 1958 13 Sheets-Sheet 11

INVENTORS
HARRY W. RUBINSTEIN
SIDNEY B. WILLIAMS
BY Connolly and Hutz
ATTORNEYS

METHOD AND MEANS FOR ASSEMBLING CAPACITORS

Filed Sept. 29, 1958

INVENTORS
HARRY W. RUBINSTEIN
SIDNEY B. WILLIAMS
BY Connolly and Hutz
ATTORNEYS

Jan. 15, 1963 H. W. RUBINSTEIN ET AL 3,073,007

METHOD AND MEANS FOR ASSEMBLING CAPACITORS

Filed Sept. 29, 1958 13 Sheets-Sheet 13

INVENTORS
HARRY W. RUBINSTEIN
SIDNEY B. WILLIAMS
BY Connolly and Hutz
ATTORNEYS

United States Patent Office 3,073,007

Patented Jan. 15, 1963

3,073,007

METHOD AND MEANS FOR ASSEMBLING CAPACITORS

Harry W. Rubinstein and Sidney B. Williams, Milwaukee, Wis., assignors to Sprague Electric Company, North Adams, Mass., a corporation of Massachusetts Filed Sept. 29, 1958, Ser. No. 763,906
17 Claims. (Cl. 29—25.42)

This invention relates to improvements in methods and means for assembling conductively-coated di-electric plates and conductive terminals into completed electric capacitors and testing the same.

Up to the present time manufacture of ceramic plate type electric capacitors has been essentially a batch process in that assembly and joining of the capacitor components and the covering, testing and marking steps were carried out in batches of a definite number of units in or on a carrier of some kind. Corrugated paper strips were commonly used as the carrier so that the capacitor components could be subjected to at least some machine operations but the carrier strips and their partially completed capacitors have had to be collected into handling means such as frames, racks or baskets for handling and stacking of a large number of capacitors, at various times between and during some of the production steps.

Although some of the machine operations handling carrier strips with partially completed capacitors or capacitor components thereon, are adaptable to the use of a continuous strip or tape, there are a number of operations involved where the capacitors have not heretofore been handled on a continuous strip or tape. Such operations as soldering the terminals to the conductive coatings, degreasing, applying a covering, equalizing the thickness and shape of the covering and curing the covering material have not heretofore been developed to the handling of capacitor components or partially completed capacitors on a continuous tape.

It is therefore the object of the present invention to provide a method and means for substantially automatically assembling capacitor components on a continuous tape on which such components or partially completed capacitors remain until all of the manufacturing operations and testing have been completed.

The method and means herein disclosed assembles and completes electric capacitors from preformed di-electric ceramic plates with conductive coatings on opposite sides thereof and to be severally joined with preformed wire terminals. The terminals are automatically formed from rolls of wire and applied to a continuous carrier tape in sets equal to the number of the conductive coatings and at spacings for their several attachment to the conductive coatings. The pre-coated plates are automatically presented edgewise to the sets of terminals and are placed and held with one terminal in contact with each coating. while so held, molten solder is automatically applied to join the terminals and conductive coatings so that the plates are held by the terminals on the carrier tape and extend in spaced relation therefrom. The carrier tape passes through air to cool the solder to ambient temperature and then passes through a chamber in which a grease solvent cleans the plates and at least those portions of the terminals between the carrier tape and the plates.

The tape then passes adjacent means for wax banding the terminals at a given distance from the plates to prevent adhesion of a covering material to the terminals. Next the carrier tape passes over and the disks and portions of the terminals pass through, a melted material capable of solidifying to a water-impervious solid inert to atmospheric conditions likely to be encountered by a completed capacitor and of sufficient hardness to resist damage in handling. The tape is kept at a constant level above the covering material so that the plates and waxed terminal portions dip into the covering material. The carrier tape and capacitors move through a vigorous air flow or other means to equalize the thickness of the covering on the plates and to increase the viscosity of the covering material above the point at which it can flow. The tape may now be passed through a heated chamber where the covering material is cured to its final form.

The tape now carries the capacitors between an anvil and hammer, or pressure rolls, where the covering material on the waxed portions of the terminals is broken off. The capacitors are now marked on one side and the tape when passes through a high electrical potential testing device to determine whether the capacitors meet the required minimum values and those capacitors not satisfying the test requirements are cut-off and discarded. The tape then passes the remaining capacitors through a marking device to apply indicia to the other side of the disks, after which the capacitors are ready for packaging and may be packaged while on the tape. If not packaged on the tape, the terminals are cut at a given distance from the disks and the capacitors are collected in bulk while the residue of the terminals may be recovered from the tape.

Figure 1:
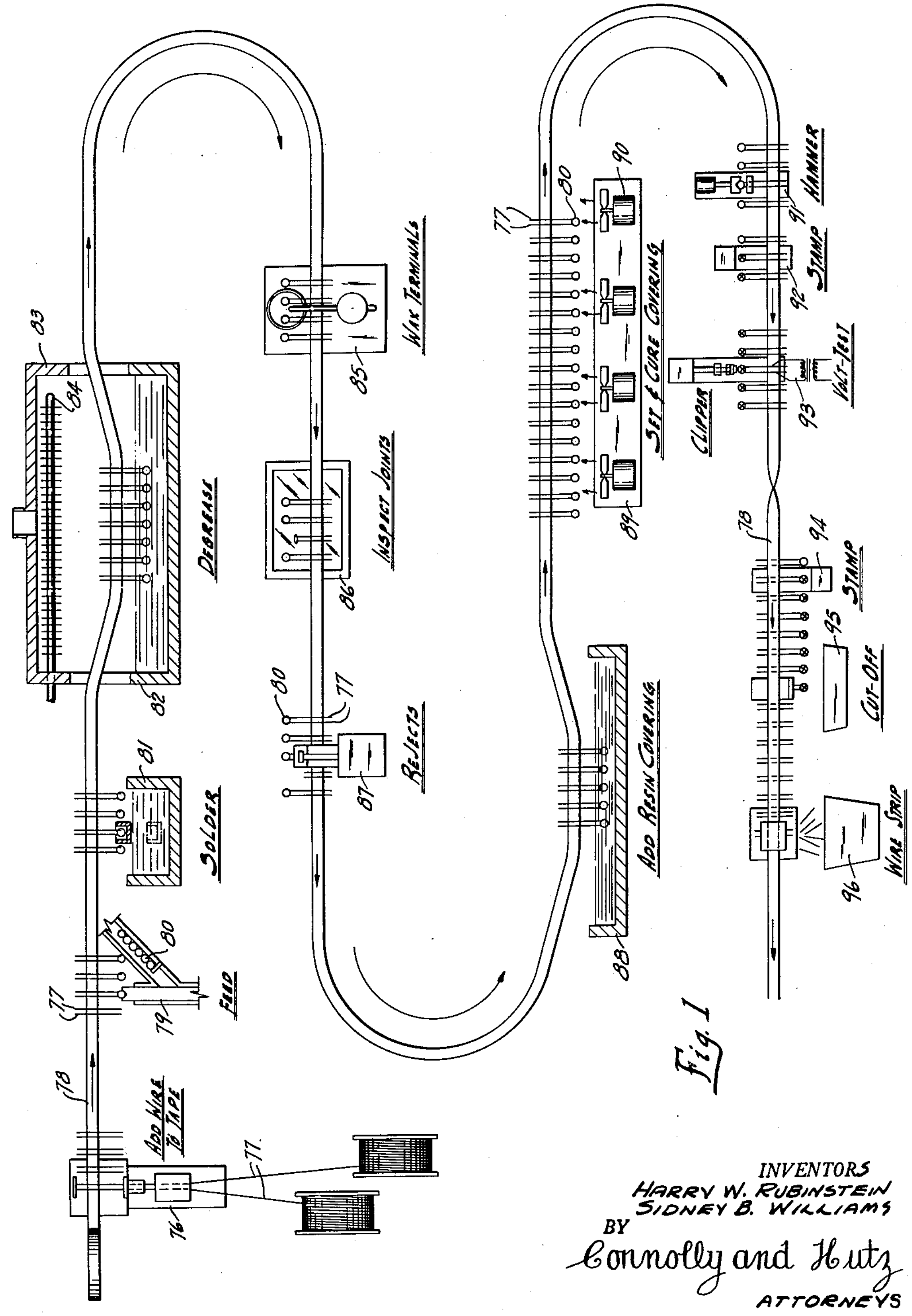
FIG. 1 is a digram showing the flow of a tape receiving pairs of leads and conductively coated disks to be joined to form capacitors and indicates the various steps for performing the capacitor assembly operation, some of such steps being combined at particular stations in the system and others of such steps being performed by individual machines.

Referring in detail to the drawings, the diagrammatic illustration of the system in FIG. 1 shows the various stations employed, it being understood that the conductively-coated di-electric plates are preformed but that all other capacitor manufacturing steps are carried out by the means illustrated herein. Station 76 indicates a mechanism for feeding a pair of wires 77 which are straightened and cut to a given length and held in given spacing and then mounted on tape 78 at right angles to the tape for carrying the terminals (and di-electric plates) thereafter throughout the entire assembly system. The tape is preferably continuous and is coated on one side with a thermoplastic adhesive and the pairs of terminals are heated and pressed into the adhesive. Station 79 takes pre-formed conductively coated disks 80 from a mixed mass thereof and brings the disks in single file to a feeder which positions the disks 80 severally between terminals 77 for bearing of the terminals severally on the conductive coatings. Station 79, in practice, is combined with station 81 at which solder is applied to join the conductive coatings of the disks and the terminals 77 by lifting a solder pot to immerse the disks in the pot. The steps of terminal straightening, cutting and mounting on the tape and the steps of delivering the disks, positioning each disk between a pair of terminals and soldering the disks, are all preformed in a timed sequence. After the terminals are mounted on the tape, the tape acts like a sprocket chain to secure accurate positioning of disks for some succeeding steps.

The tape 78 is then turned on edge for passing the di-electric plates 80 and the terminals 77 through a degreasing chamber shown at 82 and is then again turned to bring the capacitors horizontal after leaving such tank. Chamber 82 has a cover 83 and cooling coils 84 inside the cover to condense solvent vapors for recovery thereof and for reducing fire and other hazards if a flammable grease solvent is used. Stations 85, 86 and 87 are also combined, in practice, into one subassembly as the operations of waxing portions of the leads, visual inspection of the solder joints and cut-off of inadequately soldered capacitors are closely related and should be under the control of a single person. One capacitor is shown bent out of the plane of the others at station 86 because the soldering was inadequate and is shown cut-off at station 87. As the tape movement is reversed in stations 86, 87 and 88 loops of slack tape (not shown) are provided at least ahead of and after such stations to avoid interference between timed tape movements and operator-controlled action. Unless the speed of even successive timed sequential steps is the same, it is desirable to have loops of slack tape at various points between such timed steps.

Prior to arrival at station 88, the tape is again turned to pass the di-electric disks and parts of the terminals edgewise through a tank of resin for moisture-proof covering of the entire disks. At station 89 the resin covering is set and cured, which may involve only air-drying as by use of a number of fans 90 or may require the supply of heat or some other curing medium depending on the resin used. The tape 78 and the capacitors thereon may pass through station 89 vertically or horizontally edgewise and the direction of tape-capacitor movement may be changed a number of times to avoid resin flow causing unevenness in the thickness of the covering resin. The tape 78 is again brought horizontally edgewise upon entering station 91 where excess resin covering is broken off. Some indicia are applied at station 92 and the capacitors are tested at high voltage at station 93, it being understood that stations 92 and 93 are not inter-dependent and that station 92 may follow station 93. The tape 78 is now turned 180° so that the reverse side of the disks 80 are presented at station 94 for marking with further indicia. At station 95, the completed and marked capacitors are cut-off the tape with any desired length of terminal and the residue of the terminal wires 77 are removed from the tape at station 96.

FIGS. 2–9 illustrate a machine for forming capacitor leads in spaced pairs and applying the pairs of leads 77 in predetermined position and spacing to the tape 78 as indicated at 76 in FIG. 1, as a carrier for the capacitors during the entire assembly and testing thereof. A frame 100 resembling a table has hingedly mounted thereon a plate-like base 101 which is held at an angle relative to horizontal by adjustment of a rod 102, to shed leads which fail to adhere to the tape 78. Two spools 103, 104 of tinned copper wire are moutned to one side of the base plate and both wires 77 pass through guides 106 and wire-straightening rollers 107 and through two chucks 108, 109 (see FIG. 6) for gripping the wires to draw predetermined lengths thereof off the spools through the straightening means and advance them into the forming and cutting mechanism shown in detail in FIGS. 4–9.

The feeding function is performed by an air cylinder 110 with the air pressure on both sides of the reciprocating piston controlled by the usual magnetically operated valves (not shown) so that the wires 77 simultaneously are advanced only a given distance and in a timed cycle. The chuck 108 is reciprocated by the piston of the air cylinder and successively grips and advances the wires 77 and releases the wires on return of the piston while the chuck 109 which is stationary, holds the wires in advanced position and serves as a reaction point for a spring 111 pressing the chuck 108 in its return direction. The structure of the chucks 108, 109 themselves is well known in commerce as the "Dickerman hitch feed," and is not further described.

The wires 77 advance through a shear comprising a stationary double tubular member 112 and reciprocating blade 113 and through clamping and heating means, and the spacing of the pairs of wires is controlled by a movable positioner. A switch 114 is mounted on the frame and bears a plate 115 extending around the shear tube 112. If wires should jam in the shear tubes, continued feeding of the wires will buckle and press them on plate 115 thus opening the switch 114 and shutting off the entire machine. The shear blade 113 moves in guides 117 (see FIG. 9) and is urged in one direction by springs 118 and in the other direction by means to be described. The clamping means (see FIG. 7) includes lower block 119 with means 120 comprising a rod and spring for urging block 119 toward seating on base plate 101, and upper block 121 reciprocable toward each other as the blocks are guided in brackets 122 from the table, and block 121 is urged upward by springs 123. The lower block carries pairs of electric terminals 124, 125 (see FIGS. 6 and 8) protruding from the block under the action of the springs 126 so that such terminals are urged upwardly of the block. The upper block carries pairs of resiliently pressed plates 127 to bridge wires 77, each mounted on pairs of pins 128 and with each pin under the pressure of a spring 129, one pair of electric terminals 125 and a pressure plate 127 and its pins 128 being shown in FIG. 8, to serve as parts of a circuit for electric heating of wires 77. A reciprocable positioner 133 (see FIG. 9) with grooves in its end keeps the pairs of wires 77 at the correct spacings and parallel to one another. The positioner is guided and urged in one direction by guides and springs similar to those associated with the shear blade 113, and is moved to receive the wires in the grooves while the wires are being advanced and thereafter is moved out of effective position.

The shear blade 113, upper pressure block 121 and positioner 133 are each operated against their respective springs by rollers 134 in the respective parts and cams 135–138 acting on the rollers upon rotation of a shaft 139. The lower pressure block is also operated from one of the cams by way of a pivoted bell-crank lever 140 with rollers 141 at the lever ends. The shaft 139 is driven by a motor 142 through a variable speed transmission 143 and also carries cams 144–147 which operate switches 148–152. The switches 148–152 respectively control the following circuits:

148 controls both the advance of wires 77 and release of a latch on a tape moving means when the tape is to be advanced;

149 controls return of the wire feed 106–110;

150 controls the circuit to the heater terminals 124, 125;

151 controls air pressure to a piston for advancing the tape 78;

152 controls air pressure to a piston for retracting a latch of a tape moving means and for returning the piston of such means to position for another advance step of the tape.

Figures 2, 3, 4, 5:
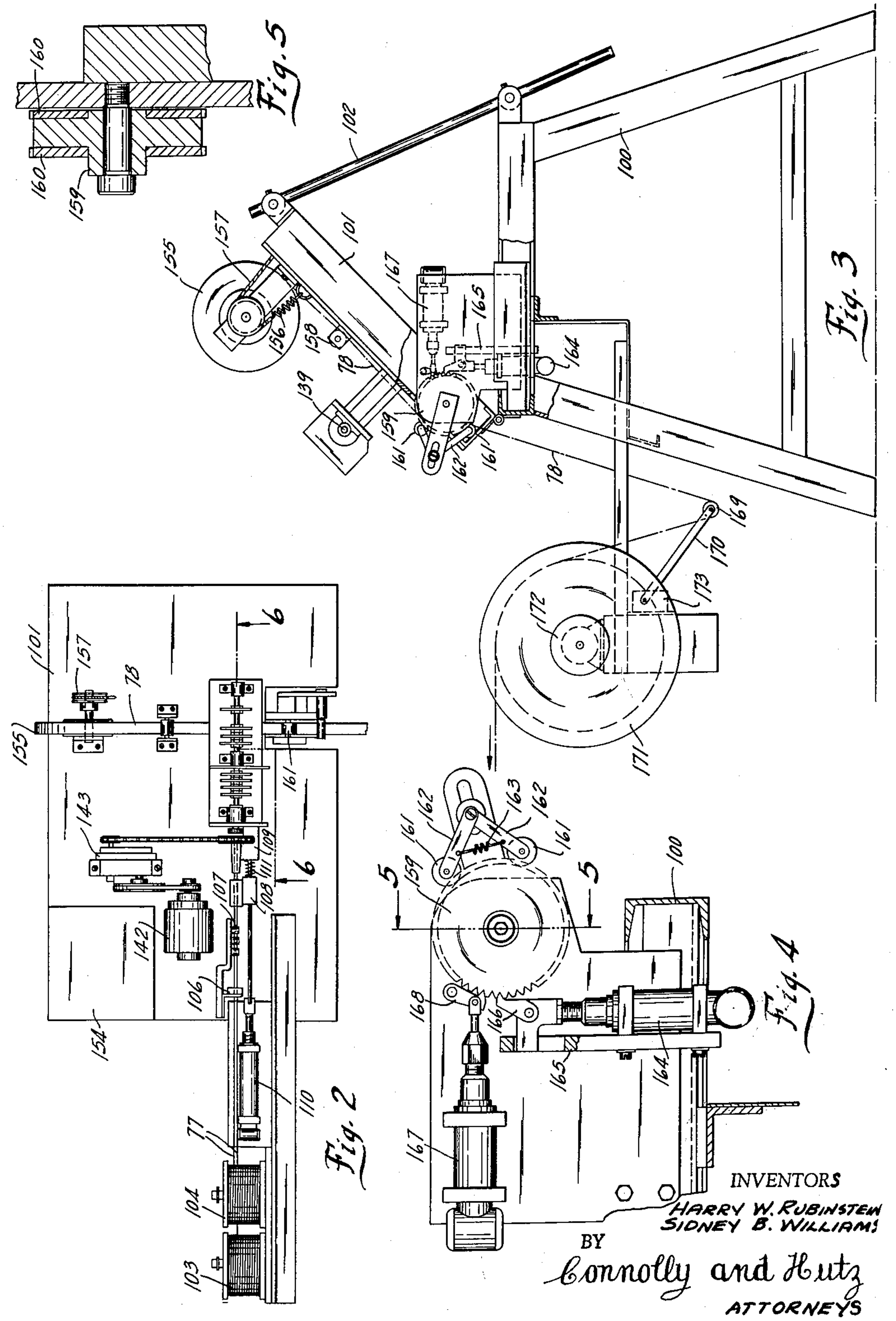
FIG. 2 is a plan view of the machine for forming and applying wire terminals to a tape.
FIG. 3 is an end elevation of the machine shown in FIG. 2.
FIG. 4 is an enlarged view, partially in plan and partially in section, of means for operating one drive-guide wheel in the machine of FIGS. 2 and 3.
FIG. 5 is a cross-section of the guide wheel shown in FIG. 4.

The switches 148–152 are threadedly mounted on bars 153 as is also the case with cams 135–138 and 144–157 mounted on shaft 139 so that all the cams and switches can be accurately positioned relative to the parts co-acting therewith. A rectangle 154 in FIG. 2 represents a box containing relays controlling flow of power to the motor 142 and relays controlled by the switches 148–152 to open and close the above circuits. Other machines to be described also include cam operated switches, relays, etc. for electric circuit control, similar to those above described and such switches, etc. are not again described in detail.

FIGS. 2–5 show means for feeding the adhesive coated tape 78 to which the pairs of capacitor leads 77 are to be adhered at a given spacing. The adhesive being of the thermo-sensitive type. A tape supply reel 155 is rotatably mounted on the base plate 101 with a spring 156 holding a cord 157 under tension to serve as a brake on the reel 155 and keep tape 78 taut under the action of means for advancing the tape. The tape 78 can move from the reel under a roller 158 and over a drive-guide wheel 159 (see FIGS. 3–5) with side plates having gear-like teeth 160 in the peripheries thereof. The teeth 160 are at spacings such as to seat the pairs of leads 77 between the teeth with the tape 78 lying below the leads in a groove centrally about the periphery of the wheel 159 whereby the pairs of leads and tape act in the manner of a sprocket chain advanced as the wheel is moved. The toothed plates 160 are interchangeable for other plates to allow different spacings of the leads and hence adaptation of the system to different sizes of capacitors.

The tape 78 is held in contact with the wheel 159, 160 by rollers 161 pivoted in arms 162 drawn toward each other by a spring 163 so that the tape is pulled off the reel and advanced beyond the wheel as the wheel is rotated. The wheel 159, 160 is indexed in steps by the piston of a first air cylinder 164 mounted on bracket 165 which also forms a limiting stop for the piston and its pivoted pawl 166 is engageable with the teeth of the wheel to move the wheel and tape in steps of an exact length. The piston of a second air cylinder 167 actuates a pawl 168 which is pivoted for engagement with the teeth of the wheel 159, 160 to co-act with the first cylinder and pawl in latching the wheel between tape advancing strokes of air cylinder 167 and thus assuring movement of the wheel in one direction only and only by steps of given length. Each air cylinder is provided with the usual electromagnet operated air valves controlling movement of the pistons thereof in both directions so that each piston movement is itself quite positive.

The tape 78 passes between the clamp-pressure blocks 119, 121 with the adhesive surface upward and adjacent to the pair of leads 77 being cut at each stroke of the shear blade 113. The pair of leads is put into electrical circuit by the shunt bars 127 to heat the leads as the blocks 119, 121 move toward each other to press the leads into the tape adhesive. Thus the tape 78 bearing the pairs of leads 77 may now pass to the guide wheel 159, 160 for the receiving of the tape and the ends of the pairs of leads as above described. The tape 78 then passes beneath roller 169 on a pivoted arm 170 and thence to another guide wheel 171, the roller serving to keep the tape taut even though it is moved stepwise by wheel 159 and taken up continuously or moved in steps of different lengths beyond guide wheel 171. If desired the member 171 may be a reel with an electric motor 172 controlled by parts 169, 170 acting as a sensing device and operating a switch 173 to keep the tape taut and compensate for difference in rate of movement of the tape to the reel and the rate at which the tape is wound on the reel. Thus, the present machine may be used where the tape does not move continuously from station to station as shown in FIG. 1.

In operation of the present machine, the pair of wires 77 is advanced until the ends of the wires enter the grooves in the spacer 133. The clamp blocks 119, 121 now move together to hold the wires in given spacing. The pairs of heater terminals 124, 125 are now in contact with the several shunt bars 127 and the circuits thereto are closed so that the leads are heated and the adhesive is softened for pressing of the lead thereinto by pressure blocks 119, 121. The shear blade 113 now cuts the pair of wires 77, the clamp blocks and shunt bars part and the spacer moves away so that the pair of leads is released and the tape may be advanced one step. It will be understood that the feed mechanism 108 for the wires is retracted as the wires are clamped by blocks 119, 121 and that the other above-mentioned parts advance and retract in sequence so that the above actions are continued at regular rate so long as the machine is operated, under control of the two sets of cams 135–138 and 144–147 and switches 148–152.

The several sets of cams are timed to secure operation of the wire feeding air cylinder 110, the wire clamp-pressure means, the heater shunt bars, and the shear blade in a definite sequence and with the necessary time delays to secure the operations above described. The leads are positioned on the tape at an exact distance between the leads of each pair and between several pairs of leads and the tape is supplied in steps of an accurately controlled length so that the spacing of the leads on the tape and their placement at right angles to the center line of the tape is very exact and is usable in positioning the pairs of leads in subsequent operations.

The machine at the second station 79, 81 in the present system receives a mixed mass of preformed dielectric disks with conductive coatings on opposite sides and delivers the disks single to a given point and in a given position, receives the tape with the pairs of leads thereon, positions a disk with each lead of a pair in contact with one coating on the disk and solders the leads to hteir respective coatings. Referring to FIGS. 10–27, a vibrating means 179 known commercially as a "Lundberg vibratory parts feeder," has a basin with a flat bottom to receive a mass of disks. The internal wall of the basin has a spiral ramp thereon and the said means has vibrating mechanism which sets the disks on edge and causes movement of the disks up to the ramp to a discharge point for the feeder. Such parts feeder being well known, no further description thereof is given herein.

Figures 13, 14, 15, 16, 17, 18, 19, 20, 21:
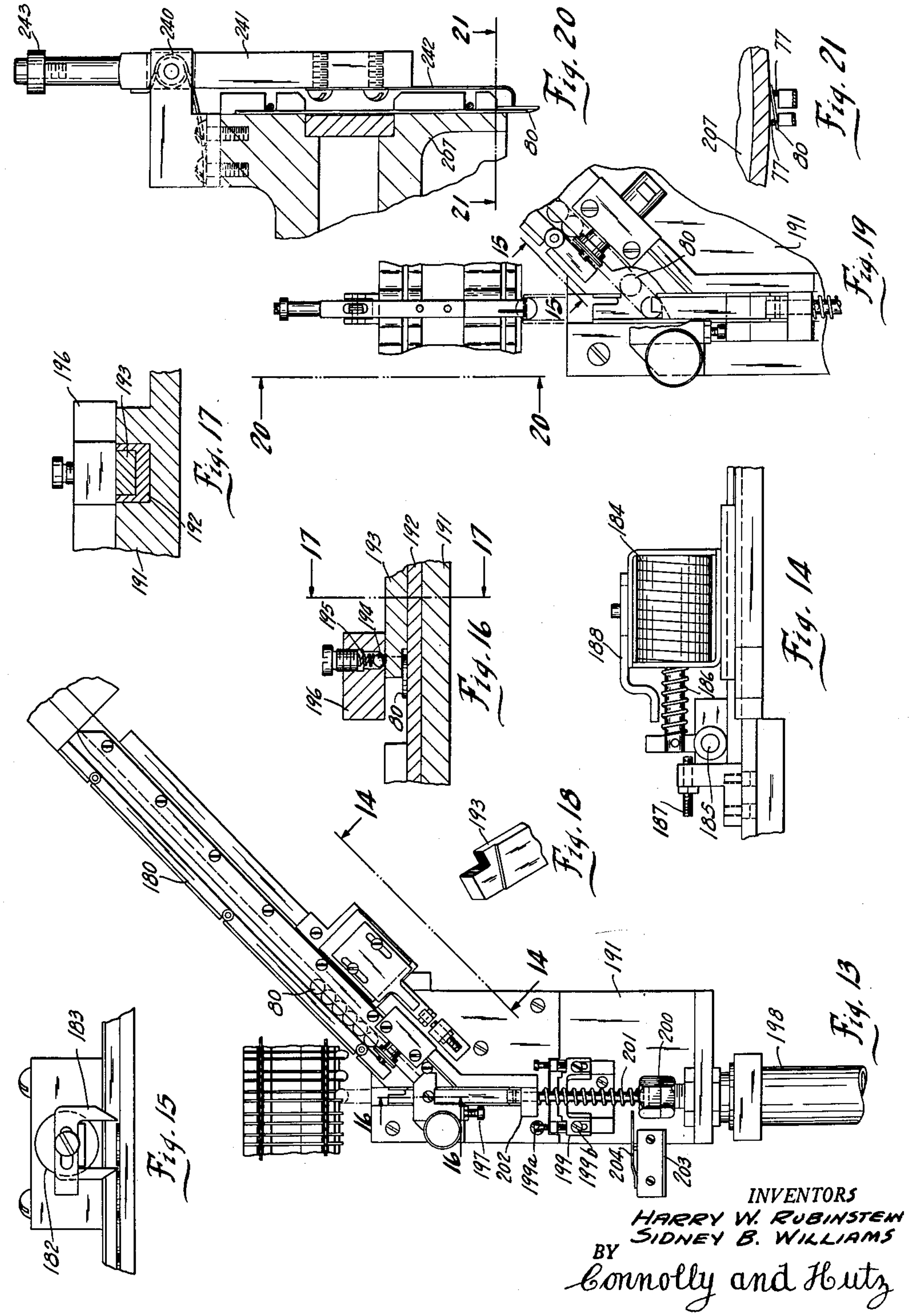
FIG. 13 is a side elevation of a mechanism for feeding coated di-electric plates between pairs of terminals and is taken on line 13—13 of FIG. 11.
FIG. 14 is a view of a portion of FIG. 13 looking toward line 14—14 of FIG. 13.
FIG. 15 is a plan view of portion of the structure shown in FIG. 13.
FIG. 16 is a cross-section on line 16—16 of FIG. 13.
FIG. 17 is a cross-section on line 17—17 of FIG. 16.
FIG. 18 is a perspective of one element in FIGS. 13–15.
FIG. 19 is an enlarged elevation of portion of the structure of FIG. 13.
FIG. 20 is an enlarged cross-section as if taken on the line 20—20 of FIG. 19.
FIG. 21 is a cross-section on line 21—21 of FIG. 20.
Figure 25:
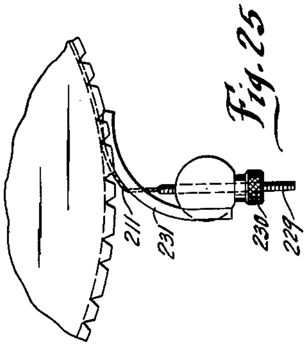
FIG. 25 is a plan view of the structure shown in FIG. 24.
Figures 24, 26, 27:
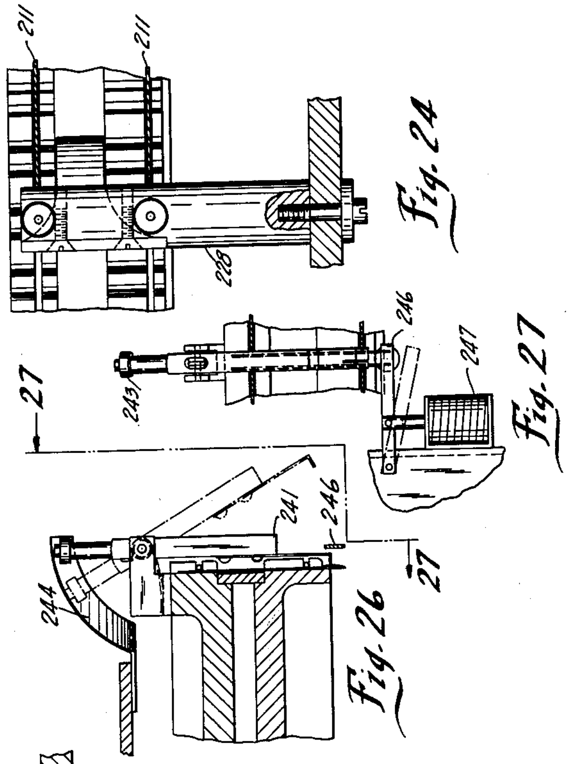
FIG. 24 is an elevation of a portion of the structure as if taken on line 24—24 of FIG. 12.
FIG. 26 is a fragment of the structure shown in FIG. 22 with one part thereof in dotted line in an intermediate position and in full line in a final position.
FIG. 27 is a fragmentary elevation on line 26—26 of FIG. 26 to show means for control of the fingers holding the disks in soldering position.
Figure 22:
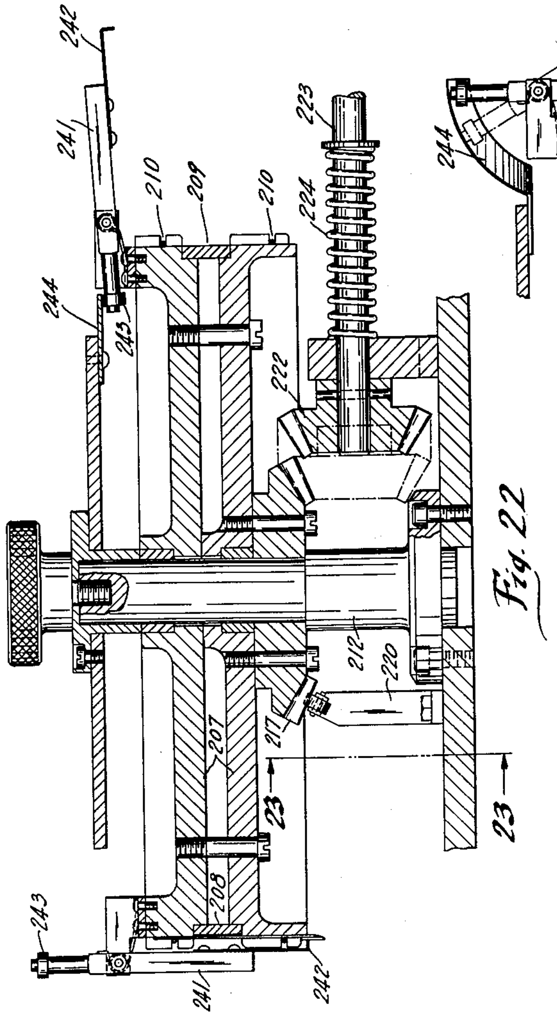
FIG. 22 is a cross-section on line 22—22 of FIG. 11.
Figure 23:
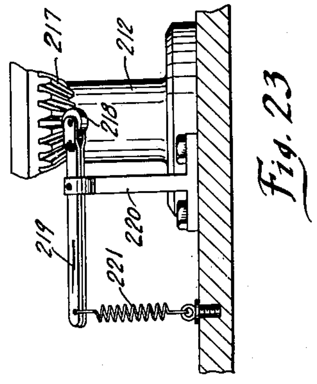
FIG. 23 is a fragment in elevation as if on line 23—23 of FIG. 22.
Figure 30:
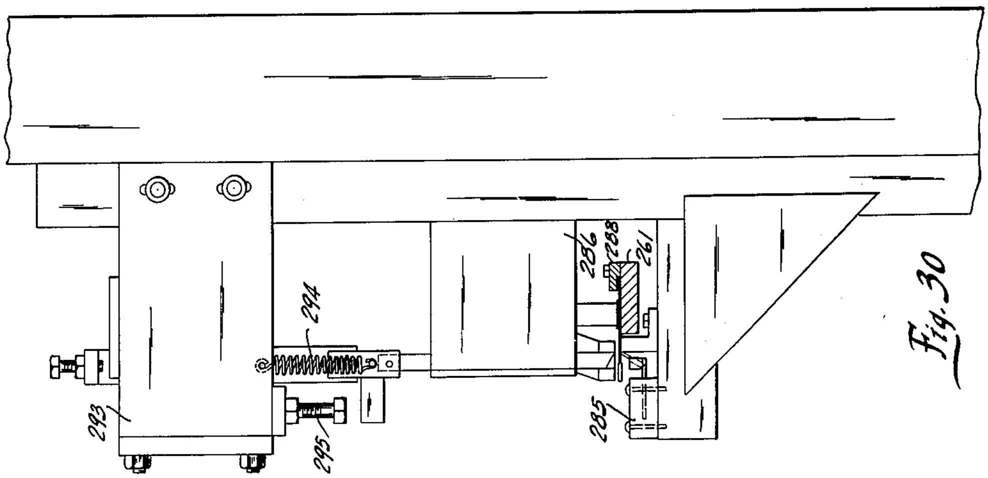
FIG. 30 is a cross-section view on line 30—30 of FIG. 28.
Figure 29:
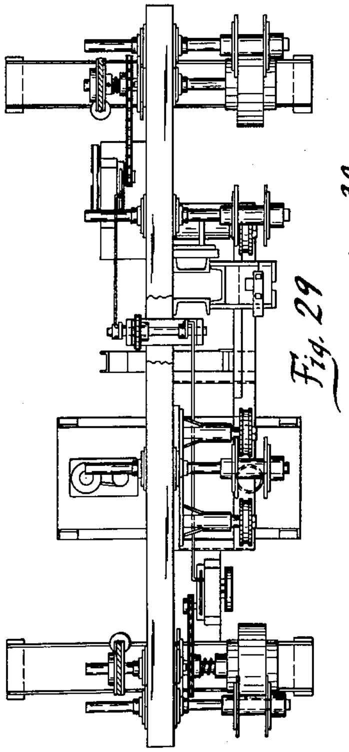
FIG. 29 is a plan view of the machine of FIG. 28.
Figure 28:
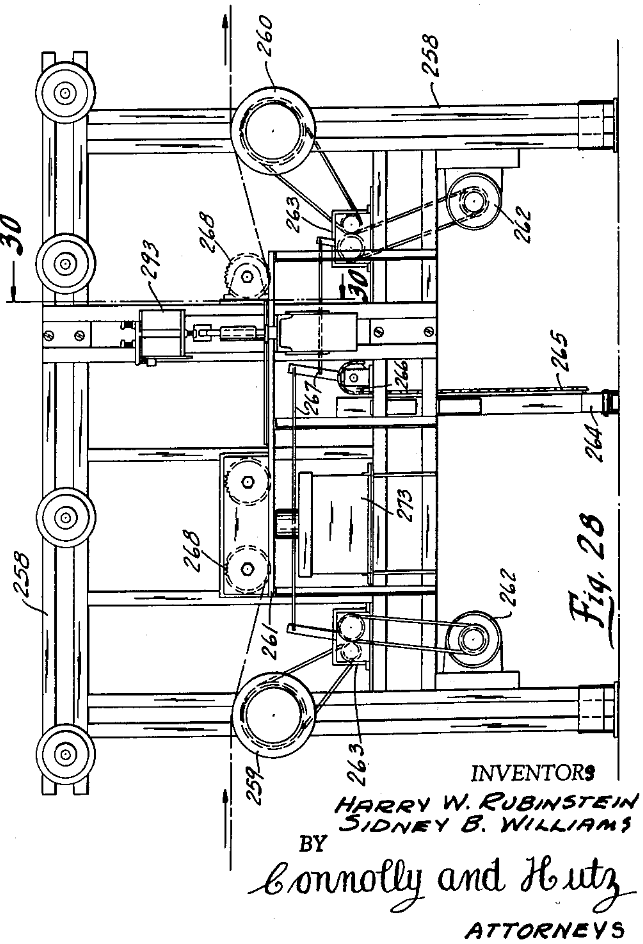
FIG. 28 is a front elevation of the machine for applying a band of wax to the terminals adjacent the plates and for performing visual inspection of the capacitors.
Figures 31, 32, 33, 34:
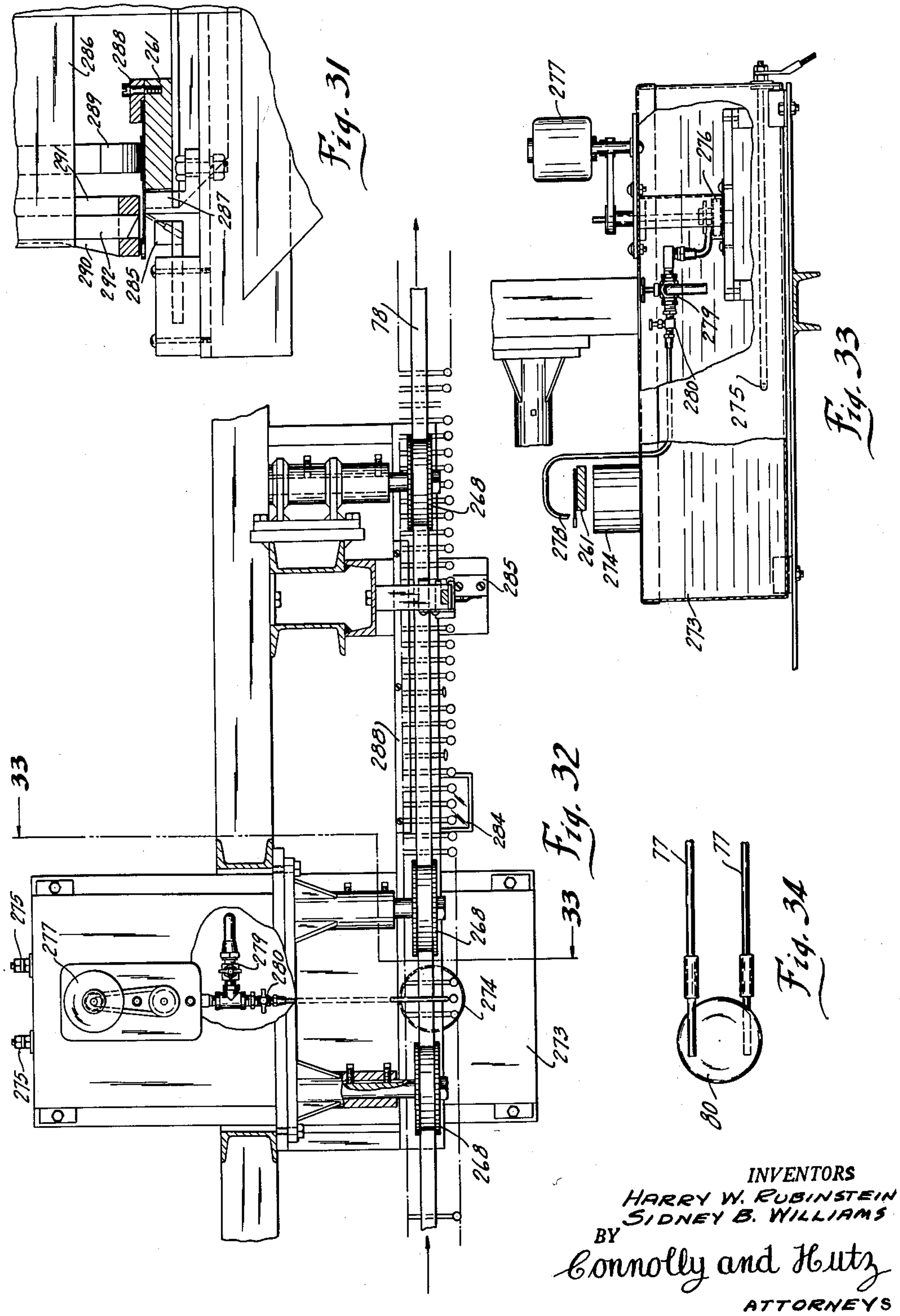
FIG. 31 is an enlarged fragment, partially in section, of the structure shown in FIG. 30.
FIG. 32 is a view partially in plan and partially in section of a portion of the machine shown in FIGS. 28–30.
FIG. 33 is a view partially in side elevation and partially in section on broken line 33—33 of FIG. 32.
FIG. 34 is a plan view of a capacitor with wax bands applied to a portion of the leads adjacent the disks.

At the discharge point from the feeder 179, a chute 180 receives and passes the coated disks 80 in single file (see FIG. 13) and delivers the disks severally to a positioning device. The chute 180 is made with several adjustable inserts so that disks 80 of different size may be rolled in single file down the chute. FIGS. 13, 14 and 15, especially, show an escapement for discharging single disks from the chute. The escapement comprises an oscillating shaft 182 bearing a fork 183 (see FIG. 15) adjustable as to size and allowing passage of only single disks at each oscillation of the escapement. The escapement shaft 182 is oscillated by a solenoid 184 (see FIG. 14) having a crank 185 on its armature under the pressure of a spring 186 and its stroke in one direction is limited by a screw 187 and is limited in the other direction by an adjustable bar 188. The solenoid armature thus oscillates the escapement shaft once per stroke of the solenoid and within precise limits of movement.

Upon release of one disk 80 from the chute 180 by the escapement 182—188, the disk rolls through a slot into a feed mechanism which comprises a frame 191 (see FIGS. 13 and 16–19) grooved to receive a movable guide 192 in which a feed bar 193 is reciprocated, the feed bar having a cut-out (see FIGS. 16 and 18) in its end to act in cooperation with the guide to form a pocket for receiving a disk 80. The feed bar is under the action of a ball 194 under pressure of spring 195 in a readily removable holder 196 to allow for variance in thickness of the disks 80 but tending to keep the feed bar 193 seated in its guide 192, and such structure is combined with an adjustable stop 197. The feed mechanism is operated by an air cylinder 198 controlled by solenoid actuated valves as previously described. The air cylinder is mounted on the frame 191 and has an adjustable stop 199 formed as a bracket adjustably attached to the frame 191 and provide with screws 199a and 199b to lock the stop 199 in place. The feed bar 193 is attached to the air cylinder piston by a nut 200 which engages stop 199, on its forward stroke. The piston of air cylinder 198 has fixed thereon the feed bar 193 and extends through a block 202 on the feed bar 193, on which is seated a spring 201 which is seated at its other end on the nut 200 on the piston rod. Both the feed guide 192 and the feed bar 193 are actuated by the piston but movement of the feed guide 192 is limited by the stop 199 while the feed bar 193 can travel farther until its block 202 strikes stop 197. The frame, guide, feed bar, etc. are tilted slightly so that each disk 80 passes between a pair of leads 77 as shown in FIG. 21. It will be noted that both the feed guide 192 and the feed bar 193 (see FIG. 18) are notched at one upper corner to provide a space for entry of the leads when a disk is to be placed between them.

A switch 203 is mounted with its operating arm 204 extending into the path of nut 200. Such switch controls escapement solenoid 184 and allows energizing of the solenoid for delivery of a disk only after the feed guide and bar are retracted and the switch arm 204 is free from the nut 200.

The pairs of leads 77 on the tape 78 are fed onto a drum (see FIGS. 10–12, 22 and 24) formed by two similar and generally disk-shaped member 207 with peripheral flanges joined by an intermediate ring 208 with matching teeth cut across the periphery of both the members 207. The ring 208 is set into members 207 and co-acts with members 207 to provide groove 209 centrally about the drum. Two grooves 210 are formed intermediate the central groove 209 and the ends of the drum teeth (see FIGS. 20, 22 and 24), all the grooves extending around the entire drum periphery. The central groove 209 is adapted to receive the tape 78, and the notches between the drum teeth are adapted to receive the pairs of leads 77 which extend at right angles from both edges of the tape. The intermediate grooves 210 are adapted to receive wires 211 acting somewhat like belts for holding the leads firmly in their notches as the leads are carried on part of the drum periphery. The drum 208—210 is mounted on a relatively heavy axle 212 and is driven by way of an air cylinder 213 with a pivoted pawl 214 connected to the piston thereof and engaging in the notches in the periphery of the drum so that the drum moves in steps. A gear 217 is fastened to the underside of the drum 207—210 and is engaged by a roller 218 pivoted on arm 219 which is pivoted on stand 220 and is under the action of spring 221 so that the roller may hold the drum in its indexed positions. The gear 217 may be engaged by a gear 222 on a shaft 223 upon movement of the gear and shaft axially against the pressure of a spring 224 so that the drum may be rotated by a hand-wheel on the shaft 223 whenever desired. If it is desired to use the present machine in a system where the tape does not move directly from station to station, the tape is fed to the drum 207—210 from a reel 225 braked by a motor 226.

The belt wires 211 lie in the groove 210 for only a portion of the periphery of the drum and are held relatively taut to bear on the pairs of leads 77 and to seat them firmly in the notches between drum teeth. Two posts 228 extend alongside the periphery of the drum adjacent the end of the arcs of the belt wires 211 on the drum and carry screws 229 attached to the ends of the belt wires and co-acting with nuts 230 for keeping the belt wires taut. Arcuate arms 231 extend from the posts 228 to bear on the tape 78 and co-act with belt wires 211 in keeping the tape 78 and its pairs of leads 77 in given position on the drum periphery.

Fingers (see FIGS. 19–22, 26 and 27) are mounted on the upper end of the drum, there being one finger for each pair of notches (and leads), to pivot into position for receiving and resiliently holding a coated disk in place between a pair of leads. The fingers each comprise a torsion spring 240 fixed to one end of the drum and pivotally supporting a finger bar 241 intermediate its length. Each finger bar carries a leaf spring 242 at one end as a finger tip for resiliently bearing on the capacitor disks 80 and leads 77 to hold them in firm contact for soldering when the fingers are released. At the other end the finger bars 240 carry a roller 243 which may be engaged by a cam plate 244 rotating with the drum. The cam plate 244 is so placed (see FIG. 26) relative to the drum 207—210 that it engages with the finger rollers 243 at locations where the fingers are to be swung away from disk-holding position while the disks 80 are being brought between the leads 77.

The cam plate 244 releases a finger whenever a disk 80 reaches the proper position between a pair of leads 77 (see FIGS. 20 and 21) so that the spring finger tip 242 may engage the disk and leads and such engagement is continued until the solder cools sufficiently to hold the disk to the leads. As fingers 240—243 are released by cam plate 244, they swing toward a disk between leads, as shown in dotted line in FIG. 26. However, a bar 246 is pivoted on a bracket to swing into and out of the path of the finger approaching a disk. Bar 246 is lifted by a solenoid 247 which is controlled by a cam switch such as previously described so that the bar drops just as a disk moves into place.

A pot for molten solder extends under the periphery of the drum 207—210 and a solder ladle 251 dips solder from the pot and carries it upward until a disk 80 and its leads 77 dip into the ladle. The ladle 251 is mounted on the piston of an air cylinder 252 which lifts the ladle filled with solder as each disk and its leads reach a given position and then lowers the ladle so that the soldered disk and leads may move beyond the soldering position and the next disk and leads may come into such position. It will be noted that the drum 207—210 is at an angle to vertical and that the solder ladle 251 moves at an angle to vertical. Thus excess solder drains from the disk (and leads) directly to the solder pot 250 with the minimum possibility that the solder will cool on parts of the mechanism. A layer of wax on the solder in pot 250 prevents excessive solder oxidation and reduces the tendency of the hot solder to crack the ceramic disks due to heat shock.

The magnetic valves for the several air cylinders and the several solenoids in the present machine are in electric circuits energized in the described sequence but with time delay between some steps. Such control is by means of cam operated switches and relays as described above and not again shown herein. It will be understood that the circuits of the various air cylinders valves and the various solenoids used in the present machine, are energized in a timed cycle to secure movement of the respective parts in sequence and with suitable time delays to secure the actions described above.

After soldering the capacitor disks 80 to their pairs of leads 77, the disk coatings and portions of the leads adjacent the disks must be freed from grease and wax. The tape is accordingly passed through a tank 82 (see FIG. 1) in such manner that the disks and a portion of their leads dip into a grease solvent in the tank, the tape being guided and turned by a number of grooved and toothed wheels (such as previously described) into which the tape and leads seat. It will be understood that degreasing can also be accomplished by the use of solvent vapors only, in which case heating means are applied to the tank and condensing coils are also placed about the slots for entrance and exit of the tape.

The degreased and dry disks 80 and leads 77 with tape 78 now go to a station for applying bands of wax about the leads at a given distance from the edges of the disks, for visual inspection of the solder joints and for cutting off improperly soldered disks, as illustrated in FIGS. 28–34. A frame 258 supports guide and drive wheels 259, 260 and a table 261 carrying the leads and disks, the drive wheels being operable severally at variable speed by electricm otors 262 acting through variable transmissions 263. The variable transmissions 263 are known in commerce as the "Revco, Zero-Max" and are of the disk type so that any speed from zero to 450 r.p.m. may be obtained by pressing on foot treadle 264 which acts through chair 265, sprocket wheel 266 and leverage 267 to rock a cam in each of the transmissions. The motors 262 and the reversible variable speed transmissions 263 allow movement of the tape in either direction and at various speeds for waxing the leads, direct visual inspection of the solder joints on one side and inspection by reflection on the other side without operator eyestrain. The tape may be automatically stopped to allow cut-off of whatever number of capacitors are found defective at this stage of their assembly but such stoppage is not usually necessary. The tape 78 may be guided by wheels 268 (such as previously described) engaging the pairs of leads 77 on the tape 78 or the table 261 may be provided with a laterally adjustableplate to co-act with the table in forming a slot receiving and guiding a portion of the tape 78 and of the terminals 77 from the ends which do not carry the disks 80. A pot 273 containing a molten wax composition is placed beneath the table and has a neck-like opening 274 extending upward adjacent the table and between two of the guide wheels 268 (see FIGS. 32 and 33). The wax pot is provided with a heater 275 preferably thermostatically controlled to keep the wax molten and within a given temperature range. A pump 276 within the pot is driven by an electric motor 277 and delivers liquefied wax to a nozzle 278 above the pot neck, the jet of wax striking each of the leads 77 as they pass the nozzle, at the same distance from the disk. Having been previously degreased, the leads are clean and wax clings on each lead and spreads around the lead sufficiently to form a band approximately ⅛ inch in length (see FIG. 34). Providing wax bands of uniform size on leads 77 requires that the tape be passed ahead of the nozzle at uniform speed and the variable transmission speed is coordinated with nozzle size and pump capacity to secure the desired uniformity in the wax bands. A valve 279 serves as a pressure operated bypass to control the pressure of wax delivered to the nozzle and a valve 280 controls the quantity of wax delivered by the pump. To start the waxing operation, it is necessary only to apply heat and start the wax pump when the wax reaches the desired viscosity.

To one side of the waxing subassembly, a mirror 284 (see FIG. 32) is placed below the table to extend forward of the near edges of the disks 80. The disks 80 are moved through the present machine horizontally edgewise so that the solder joint for the upper coating of the disk 80 and its leads 77 is directly visible to an operator and the lower coating of the disk and the joint to its leads is visible in the mirror 284. If a piece appears on which the operator thinks a joint has not been adequately soldered, the disk 80 is bent downwardly out of the plane of the table 261. Continued movement of the tape 78 brings the bent down disk to a microswitch 258 (see FIGS. 28, 29 and 30) which is closed by the downwardly bent disk to actuate a shear for cutting the bent-down disk off its leads. The shear (see FIGS. 30 and 31) includes bracket 286 supporting a base plate 287 forming the stationary blade of the shear and provided with a positioning block 288 co-acting with the table to form a slot receiving portion of the leads and a holding bar 289 acting on the leads 77 beyond the wax bands thereon. The bracket 286 also supports guides 290, 291 for a movable shear blade 292 mounted on the armature of a solenoid 293. The two shear blades are of a size to cut only the two leads to the bent-down disk which has tripped the switch. The shear is returned to "ready" position by a spring 294 and the return position is fixed by a stop 295. The movable shear blade 292 has a rapid and short stroke so that any shearing action is unlikely to interfere with continued movement of the tape and the shearing off of occasional rejected capacitors can take place as rapidly as the inspection of solder joints.

In operation of the present station, the tape is first passed from left to right to inspect the solder joints then uppermost. The tape is then reversed and again passed from left to right while the waxbands are applied so that both the waxbands and the lowermost solder joints are inspected by reflection in the mirror. As an inadequately soldered joint or an insufficient waxband is found, the disk is bent down and the shear automatically cuts off such disk regardless of the direction of tape movement. It will be understood that the present machine can also be used for batch or non-continuous operations in which the tape with the soldered pieces thereon may be wound on reels and that such reels are then used in place of the guide and driving wheels at the ends of the frame. As the operation of the present machine is constantly under control of an operator, no cam switches are required. However, it is desirable that the circuit to motors 262 be interlocked with the circuit of heater 275 and pump motor 277 so that the machine cannot be operated until the wax is melted and the pump has been discharging hot wax for sufficient time to have the wax discharge at a steady state.

The visually inspected capacitors 77, 80 are now ready to be covered with electrical insulating and atmospheric-conditions resisting material so that the electrical testing can be done and so that markings of capacitor value and other markings may be applied. The tape 78 bearing the capacitor 77, 80 now passes (FIG. 1) to a heated tank 88 where the tape is carried by guide and driving wheels such as previously described and turned into substantially vertical edgewise position to dip the disks 80 and part of the leads 77 below the surface of a liquefied resin composition. Such resin sets at room temperature and its composition is well known and not herein described. It will be noted that the disks 80 and leads 77 have not been touched by the operator after degreasing and waxing so that the molten resin adheres readily to them. Capacitors are dipped to a depth to include the waxbands on the leads and the dipping is done quickly and at approximately room temperature and does not affect the capacitors.

The resin is in "slow flowing" condition and would drip off or "sag" so that the covering would not be uniform unless steps were taken to prevent such result. The tape with resin coated capacitors is accordingly set quickly as by a series of fans 90 which solidify the resin sufficiently quickly to prevent its dripping or sagging. Other means may also be used for solidifying the resin coating, such as a series of guide wheels which repeatedly change the direction of travel and the positions of the capacitors relative to horizontal for a sufficient time to allow the resin to set and harden at atmospheric conditions. In either case the coated capacitors are solidified quickly or do not remain in one position for a sufficient time to allow the resin to flow and the coating is smooth and with rounded edges and is quite uniform in thickness.

The capacitors now covered with hardened resin are taken to another station where the resin is removed from the waxed portion of the leads to expose clean leads to closely adjacent the disks. The capacitors are then passed through a marking device for stamping some of the markings on one side of the disk covering and are then severally subjected to an electrical test to eliminate those capacitors which are electrically defective. The testing device controls a shear which cuts defective disks off their leads and only satisfactory pieces pass beyond the shear.

The structure of the present machine is illustrated in FIGS. 35 through 51 as comprising a frame 297 with a guide wheel 298 mounted at each of the frame ends, the guide wheels being driven by a motor 300 by way of a chain and sprocket drive 301, the motor and drive for the right hand wheel being hidden by the wheel. The motors for the guide-drive wheels at the entrance to and the exit from the present machine are interlocked with the other circuits so that the tape loops do not exceed given size. The tape 78 and capacitors 77, 80 now move intermittently from right to left through the machine so that loops of tape 78 are provided to allow a constant rate of receipt and discharge of the tape even though the tape moves in steps at the present station, and such loops are kept under tension by pivoted arms 302 with rollers 303 bearing on the tape. From the incoming loop the tape slides on an upwardly sloping table 307 to a toothed guide wheel 308 with means (see FIGS. 37 and 38) pressing on the tape 78 to keep the leads 77 seated securely in the guide wheel notches and with a brake to keep tension on the tape as it leaves the guide wheel 308. The pressing means includes an arcuate leaf spring 309 on an adjustable arm 310, 311 mounted on a pivot 312 so that both the location of the pressure and the amount of the pressure on the tape can be varied. The tape tensioning brake comprises a pulley 316 on the guide wheel axle 317 with a frictional member 318 seated on the pulley and held by a tension spring 319 attaching one end of the friction means to the frame 297 and with a weight 320 hanging from the other end of the friction member.

Figures 40, 41, 42, 43, 44, 45:
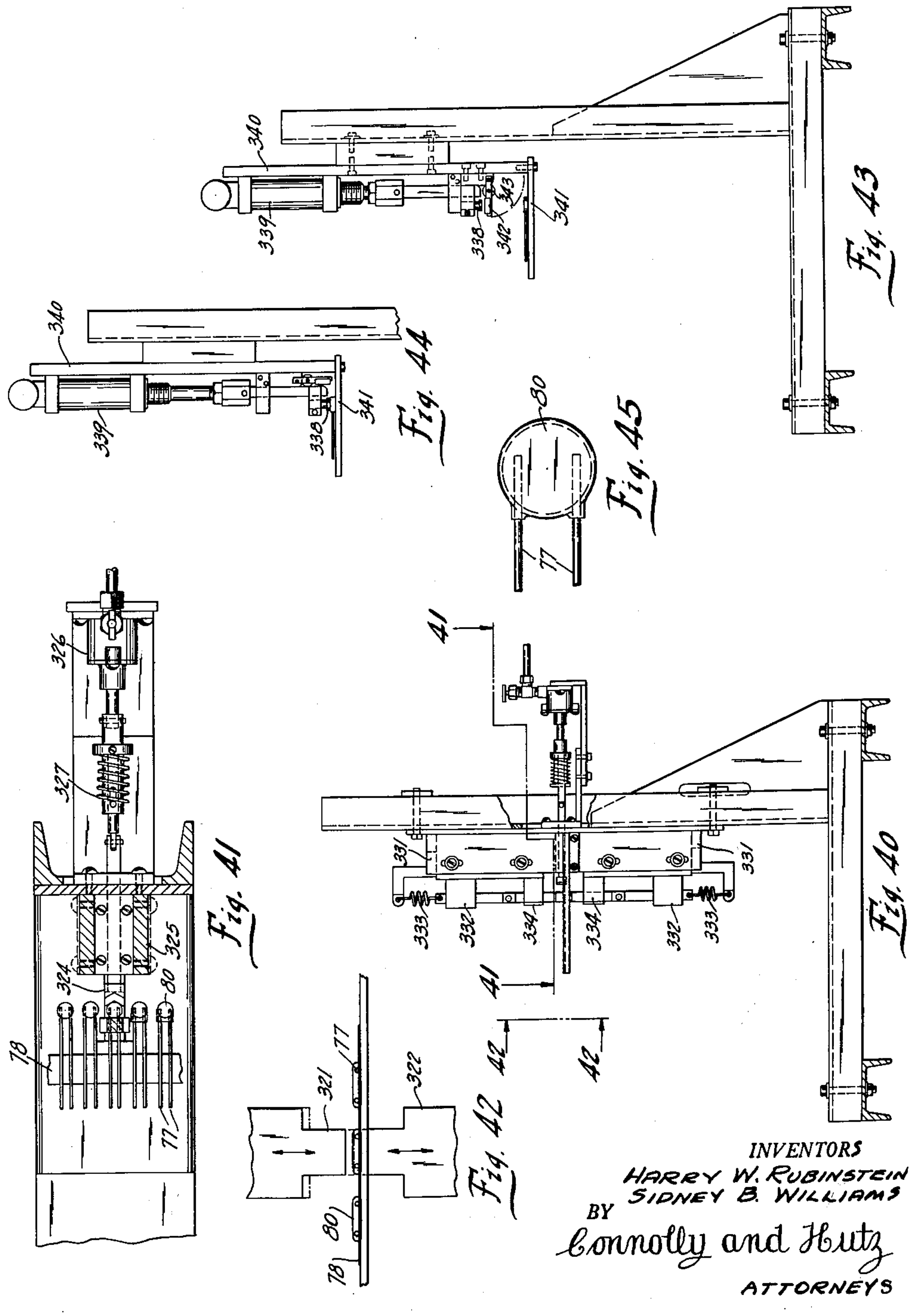
FIG. 40 is a cross-section on line 40—40 of FIG. 35.
FIG. 41 is a cross-section view on broken line 41—41 of FIG. 40.
FIG. 42 is a partial front elevation view as if looking at line 42—42 of FIG. 40.
FIG. 43 is a cross-section on line 42—42 of FIG. 35.
FIG. 44 is an enlarged fragment of the mechanism shown in FIG. 43 but in a different position than in FIG. 43.
FIG. 45 is a plan view of a coated capacitor after the excess coating on the leads has been removed.

From the guide wheel 308, the tape moves between hammer heads (FIGS. 40 and 42) by which excess resin is broken off the leads 77. As each capacitor comes to a position between hammer heads 321, 322 longitudinally of the machine, a positioning device engages an edge of a disk 80 between its leads 77 and moves the disk and its leads 77 to an exact position transversely of the hammer heads. The positioning device includes a positioning bar 324 movable in guides 325 operated by an air cylinder 326 with the usual magnetic control valve, acting against a compression spring 327 moving the bar back to allow movements of the tape. The hammer heads 321, 322 are separately and adjustably mounted on brackets 331 and are severally driven by solenoids 332 against the action of springs 333 so that the hammer heads move toward and away from each other in guides 334 to assure opposing action of such heads. When a disk has been transversely positioned, the hammer heads 321, 322 are severally forced toward each other against the action of their several springs 333 which retract the hammer heads as soon as there has been impact on the excess resin of the leads. The resin is brittle and breaks at the edge of the hammer heads nearest the disks and all resin overlying the wax bands on the leads is fractured and drops off as shown in FIG. 45.

The tape 78 and the capacitors 77, 80 now move another step which brings the capacitors to marking means for stamping some indicia on the capacitors and comprising a stamp 338 (see FIGS. 43 and 44) removably mounted on the piston of an air cylinder 339 on a bracket 340 over a table 341. As air is admitted to the cylinder 339, the stamp 338 is pressed on the disk 80 to add predetermined markings. An ink pad 342 is mounted on a tension spring 343 on the bracket 340 and is swung from the position in FIG. 43 to the position in FIG. 44 as the stamp moves, and is then returned to the FIG. 43 position as the stamp 338 is retracted.

From the above stamping position, the tape 78 and capacitors 77, 80 move on the table to a position at which defective capacitors may be cut off. A pair of contacts 347 under the action of springs 348 are mounted to be pressed severally on the pairs of leads 77, when in a given position on a table 349, by a solenoid 350. After the contacts are in position shown in FIGS. 48 and 49, a high voltage circuit is closed including the capacitor 77, 80. If the capacitor is defective so that current flows in the circuit, a clipper is actuated to cut off its leads 77 any disk 80 which does not resist the test voltage. The clipper comprises a subframe 354 on which are pivoted blades 355, 356 with replaceable cutting edges 357. The blades are severally oscillated by bars 358 pivoted to the blades and to the armature of a solenoid 359. Upon energization of the solenoid 359 the clipper blades 355, 356 rock toward each other against the tension of a spring 360 and the spring retracts the armature as soon as the current flow to the solenoid ceases so that the clipper blades again rock open. A stop 361 limits return movement of the solenoid armature and the clipper blades.

Figures 35, 36, 37, 38, 39:
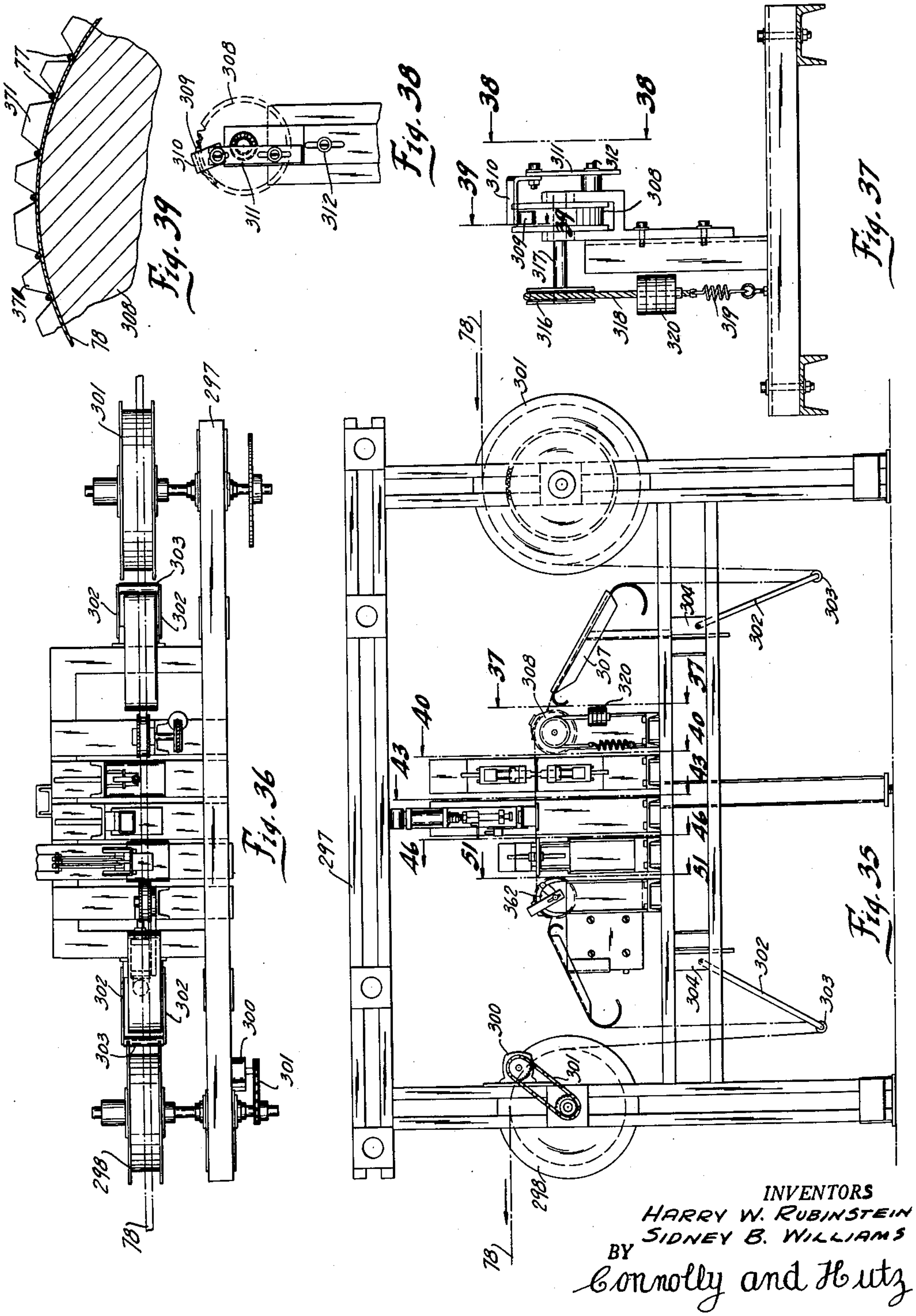
FIG. 35 is a front elevation of a machine for performing one electrical test on and for marking one side of the capacitors and for removing excess covering material from the terminals.
FIG. 36 is a plan view of the machine shown in FIG. 35.
FIG. 37 is a cross-section on line 37—37 of FIG. 35.
FIG. 38 is a side elevation of a portion of the structure shown in FIG. 37.
FIG. 39 is a partial cross-section on line 39—39 of FIG. 37.

A drive-guide wheel 362 and tape pressing means such as shown in FIGS. 37 and 38 beyond the clipper 354—361 is driven in steps and provides for stepwise movement of the tape 78 through the present machine. A pawl 363 (see FIGS. 50 and 51) is mounted to engage teeth on the wheel as the pawl is moved in one direction by the piston of an air cylinder 364 with magnetic control valves as previously described. As soon as the air cylinder piston moves, the wheel 362 is moved forward by one step and moves the tape 78 and the pawl 363 then disengages from the wheel. Another air cylinder 365 (with magnetic valve control) has a thrust block 366 on its piston for engagement with a latch 367 sliding in a guide 368 under return action of spring 369 for locking the wheel so that pawl 363 may disengage and move to the next position without movement of the wheel. Thus the tape 78 and capacitors 77, 80 are positively indexed to positions for breaking off excess resin to secure the form shown in FIG. 45, stamping markings on one side of the capacitor disks, electrical testing and clipping off capacitors found etlectrically defective.

Figure 54:
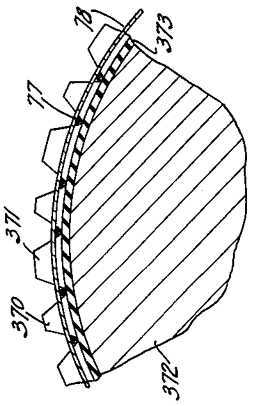
FIG. 54 is a fragment in cross-section of one of the tape guide wheels shown in FIGS. 52 and 53.
Figure 60:
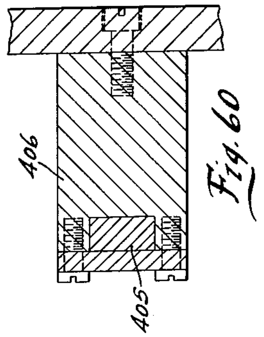
FIG. 60 is a cross-section on line 60—60 of FIG. 55.
Figure 61:
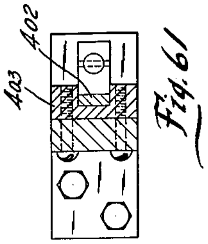
FIG. 61 is a partial cross-section on line 61—61 of FIG. 55.
Figure 53:
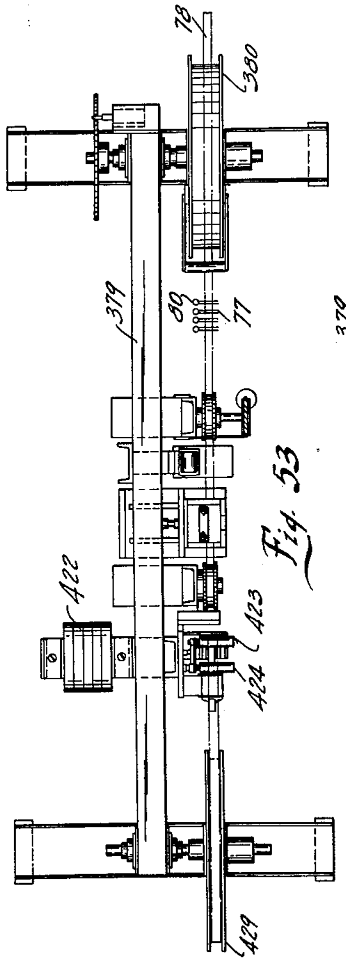
FIG. 53 is a plan view of the machine shown in FIG. 52.
Figure 52:
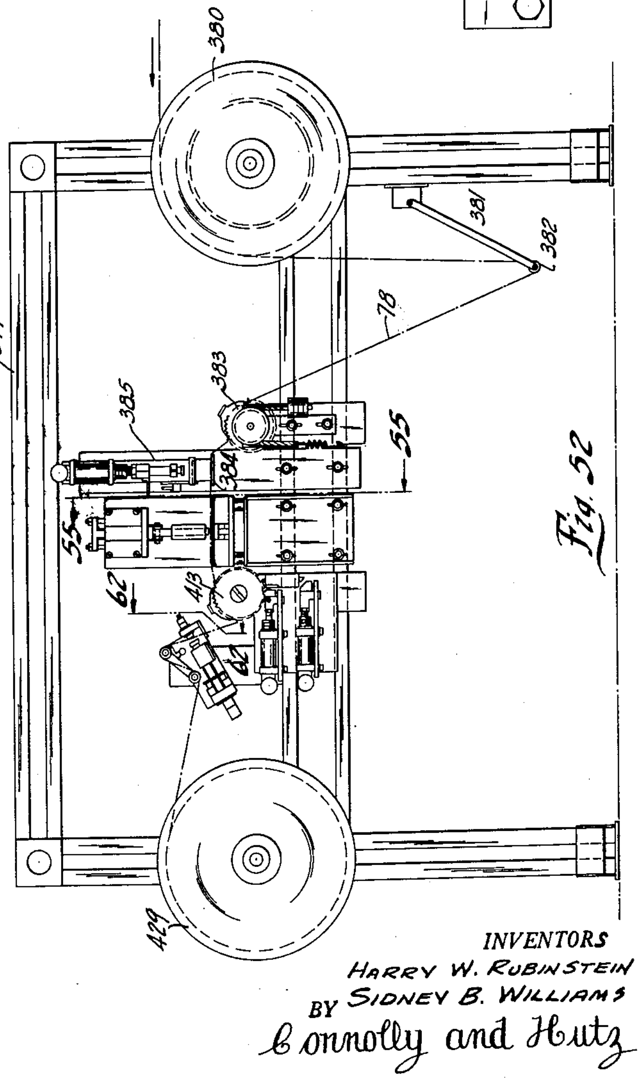
FIG. 52 is a front elevation of a machine for cutting the terminals to length and marking the other side of the capacitors and removing the residue of the terminals from the tape.
Figures 55, 56, 57, 58, 59, 62, 63, 64, 65, 66:
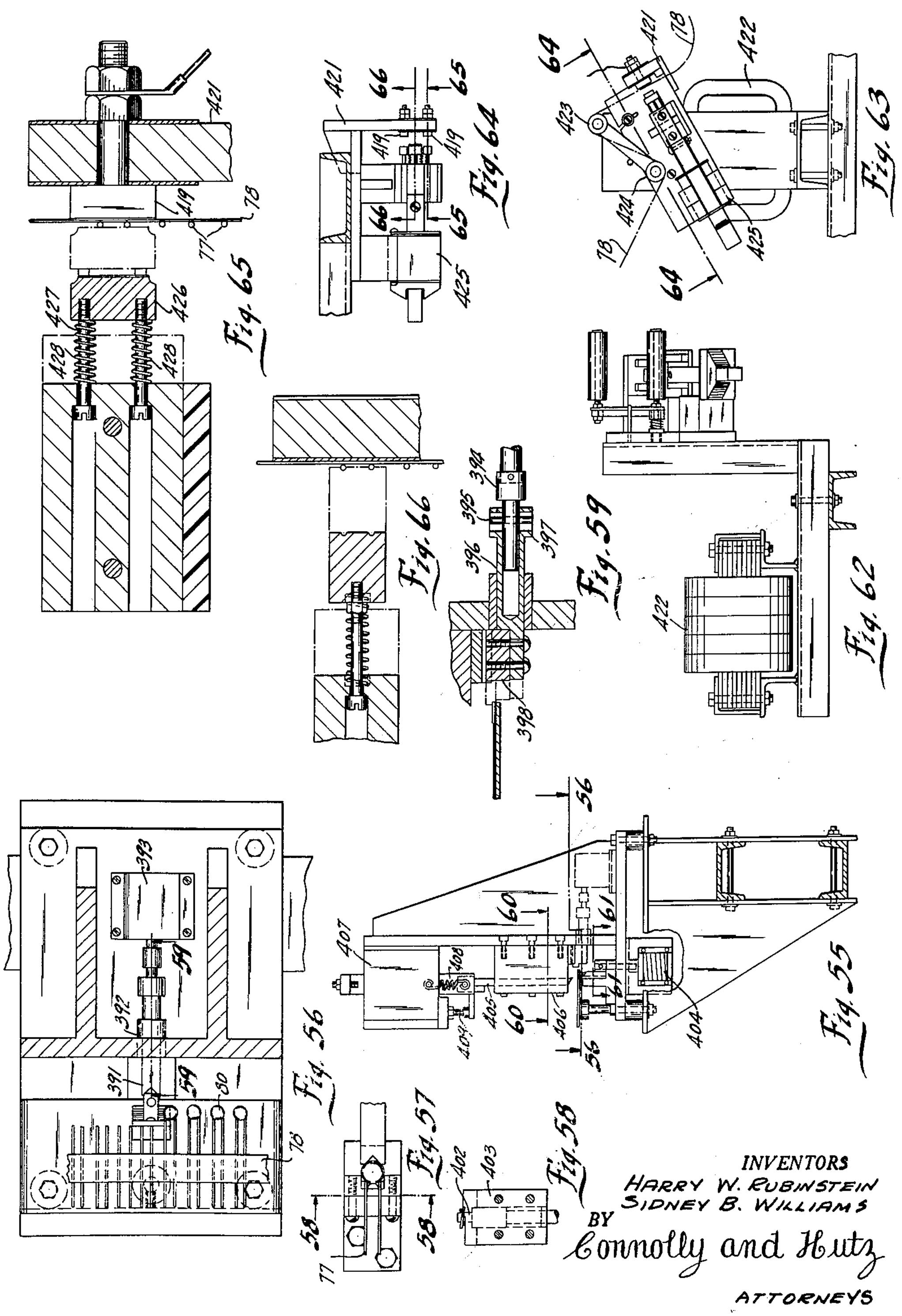
FIG. 55 is an enlarged view on line 55—55 of FIG. 52.
FIG. 56 is a cross-section on line 56—56 of FIG. 55.
FIG. 57 is an enlarged fragment of the structure in FIG. 55 showing means for placing the capacitors in a definite position relative to a shear.
FIG. 58 is a cross-section on line 58—58 of FIG. 57.
FIG. 59 is a cross-section on line 59—59 of FIG. 56.
FIG. 62 is a view on line 62—62 of FIG. 52 of the subassembly for releasing adhesive of lead wires to the tape.
FIG. 63 is a side elevation of the structure of FIG. 62.
FIG. 64 is a plan view of portion of the structure of FIG. 63.
FIG. 65 is an enlarged cross-sectional view taken on the plane of line 65—65 of FIG. 64.
FIG. 66 is an enlarged cross-sectional view taken on the plane of line 66—66 of FIG. 64.

All of the guide wheels for the tape up to this point in the system, have been the kind shown in FIG. 39 where the wheel 308 has two rows of teeth around the periphery thereof and has a peripheral groove between the rows of teeth, each row of teeth having alternate small teeth 370 and larger teeth 371 facilitating action of an indexing pawl and a holding pawl. The tape 78 lies in the groove between the rows of wheel teeth 370, 371. The apices of the notches formed by teeth are above the groove so that the leads 77 outwardly of the tape also seat in the tooth notches. Guide and drive wheels for use when tape 78 is reversed are as shown in FIG. 54 where the groove is deeper than in FIG. 39. Such guide wheels are used at 372 in the following drawings and the groove has a resilient covering 373 on which leads 77 rest while tape 78 is now outwardly from the leads.

Up to the present time, the capacitors have been visually inspected and subjected to high potential test and all visually and electrically defective capacitors have been cut off the tape and the remaining satisfactory capacitors are marked on one side with some of the necessary indicia. The remaining indicia must now be placed on the other side of the disks 80 and the leads 77 must be cut to given length dependent on specifications for the particular capacitors. Thereafter it is desired to strip the balance of the lead wires 77 off the tape 78 for salvage of the copper and tin of the wire or salvage of the tape. From the electrical testing station of the system, the tape passes to the final station illustrated in FIGS. 52–66. Such station comprises a frame 379 having guide wheels 380 of construction described as the tape 78 is now turned 180° to present the unmarked side of the disks upward.

From the guide wheel 380 the tape is again taken into a loop to provide slack for allowing a constant rate of receipt of the tape and intermittent movement of the tape through the present station, and a pivotal arm 381 and roller 382 bear on the tape to keep it from tangling. The tape moves from the loop over a guide wheel 383 with frictional means (such as the guide wheel as previously described and shown in FIGS. 33 and 38) acting on the wheel to keep a constant tension on that portion of the tape beyond the guide wheel. The tape 78 and capacitors 77, 80 pass over a table 384 below a stamping device 385 which is identical, except for the indicia stamped, with that previously described as to FIGS. 43 and 44.

The capacitors remaining on the tape have now passed all of the tests and have been completely marked so that the leads of the capacitors are to be now cut to a specified length. A positioning device comprising a pusher and a stop (see FIGS. 55–61) now locates the capacitors relative to a shear. A pusher 391 is reciprocated in guides 392 by the piston of an air cylinder 393 to engage the disks 80 and bring them against an index for exact positioning relative to the stationary member of a shear. The piston of the air cylinder 393 bears a removable rod portion 394 (see FIG. 59) with a transverse pin 395, the rod extending into a slide 396 with the pin movable in a transverse portion 397 on the slide to form a lost motion connection. The slide 396 bears a pusher block 398 with a V-notch for seating a disk therein, the block being interchangeable to accommodate different sizes of disks 80. The index comprises a vertically reciprocable bar 402 (see FIGS. 57, 58 and 61) which is of a size to just pass up between terminals 77 when such terminals are at their proper spacing. The bar moves in a groove in a fixed shear blade 403 and is reciprocated by a solenoid 404 acting against gravity so that the index bar can be rapidly moved into and out of position. A movable shear blade 405 (see FIG. 60) slides in guides 406 to cut the leads so that the completed capacitors 77, 80 with leads shortened to the specified length, drop into a delivery chute. The movable shear blade 405 is driven on its cutting stroke by a solenoid 407 acting against spring 408 and the return stroke of the shear plate is limited by stop 409. The capacitors drop into a suitable chute (see FIG. 1) and are collected in a box.

Figures 50, 51:
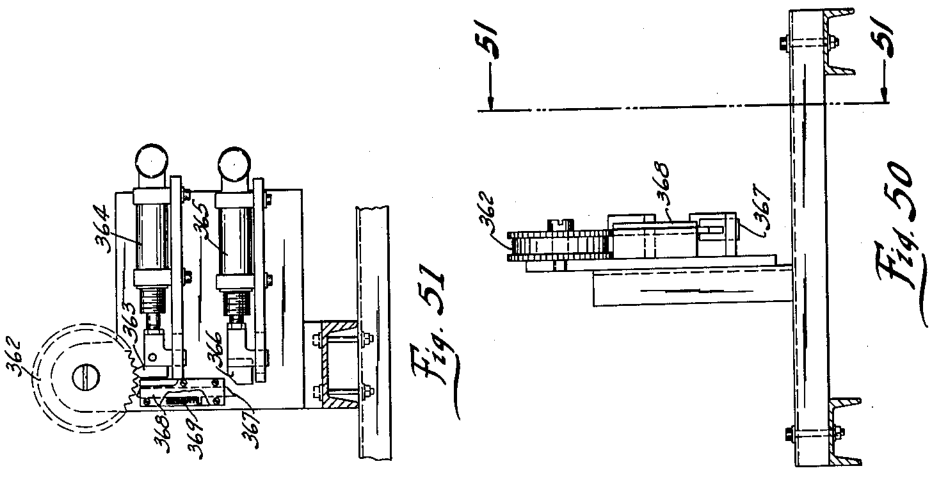
FIG. 50 is a cross-section on the plane of line 50—50 of FIG. 35.
FIG. 51 is a side elevation of FIG. 50 as if on line 51—51.
Figures 46, 47, 48, 49:
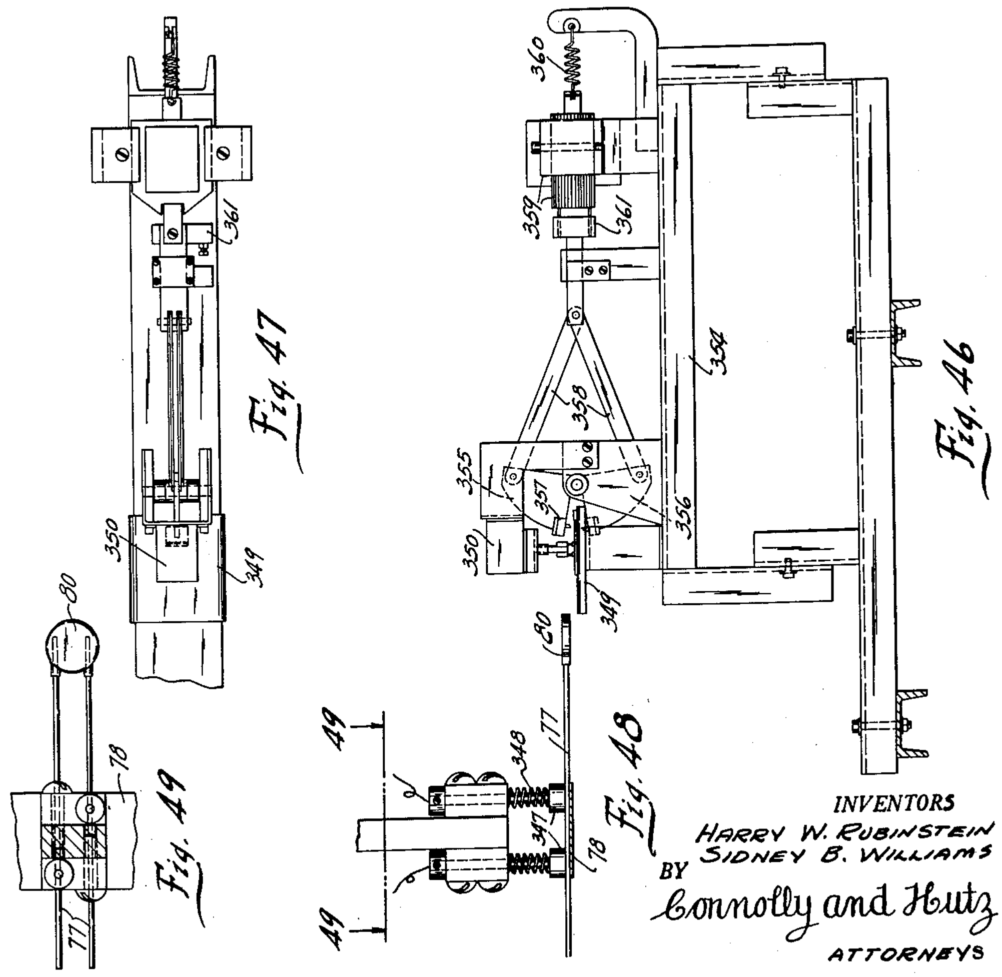
FIG. 46 is a cross-section on line 46—46 of FIG. 35.
FIG. 47 is a plan view of the structure shown in FIG. 46.
FIG. 48 is an enlarged fragment in elevation of the structure shown in FIG. 46.
FIG. 49 is a plan view of the structure shown in FIG. 48.

The tape with the residue of the pairs of lead wires 77 thereon is advanced by a driving-guiding wheel 413 driven as described relative to FIG. 51, so an exact stepwise movement of the tape between the two guide wheels 383 and 413 is thus assured. From the drive-guide wheel 413, the tape 78 with the residue of the lead wires thereon, are taken to means for releasing the wire residues from the tape adhesive so that the residual wires are discharged and the free tape can be wound on a reel. The tape passes through a heater applying electric current to the residue of the wire 77 for softening the adhesive on the tape sufficiently to release the wires by pulling the tape away from the wires. A pair of contact blocks 419 (see FIGS. 62–66) are mounted on a bracket 421 at such spacing as to be engageable with the residue of wires 77 remaining on the tape and the contact blocks are connected to a low voltage transformer 422. The tape 78 and wires 77 are drawn over the contact blocks by passing around rollers 423 and 424 of which roller 423 is pivoted to swing toward the blocks when the tape is under tension. The bracket 421 also supports a solenoid 425 having presser blocks 426 mounted on its armature. Such mounting includes pins 427 surrounded by springs 428 for resiliently taking up pressure on the blocks. Operation of solenoid 407 is timed in cycle with the rotation of the drive-guide wheel 413 so that the pressure blocks 426 are raised to press each pair of wires 77 against the contact blocks 419 and allow flow of current through the wires to soften the adhesive on the tape. The wires 77 are now below the tape and the adhesive is softened sufficiently for the wires to drop off the tape as it passes over the roller 424 and to a reel 429 on which the tape is wound. Some capacitors are required with full length of terminals and such capacitors are also passed through the present station. However, the terminal clipper is then taken out of the circuit and the complete capacitors are removed from the tape by the procedure described above for removing the wire residues.

Figures 6, 7, 8, 9:
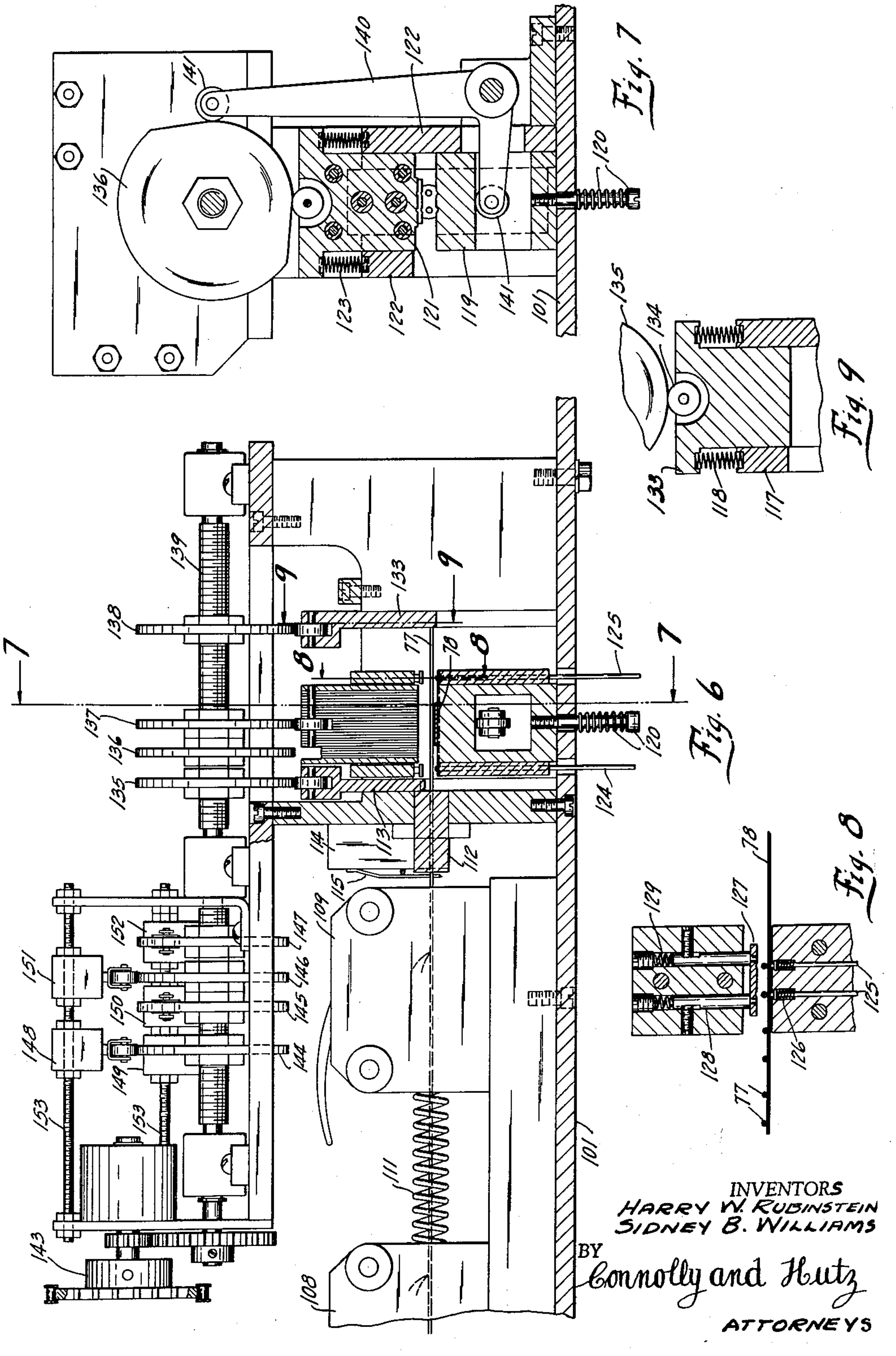
FIG. 6 is an enlarged view partially in elevation and partially in cross-section on broken line 6—6 of FIG. 2.
FIG. 7 is a cross-section on line 7—7 of FIG. 6.
FIG. 8 is a cross-section on line 8—8 of FIG. 6.
FIG. 9 is a cross-section on line 9—9 of FIG. 6.
Figure 11:
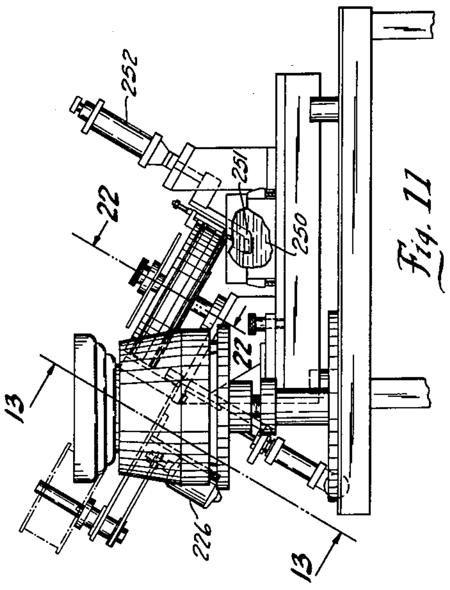
FIG. 11 is an end elevation of the machine shown in FIG. 10.
Figure 10:
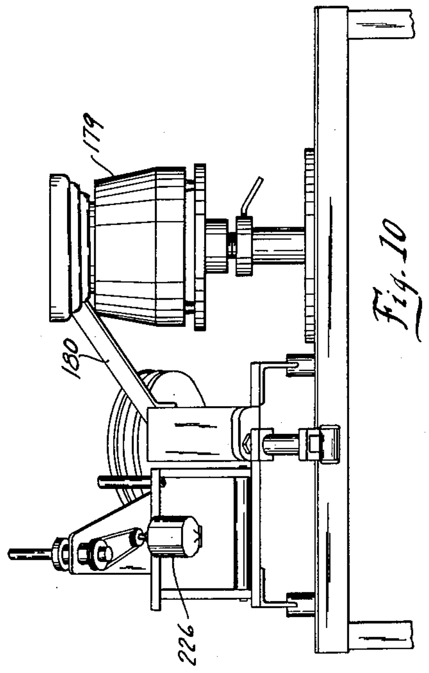
FIG. 10 is a side elevation of a machine for assembling terminals to conductive coatings on preformed ceramic plates and for soldering them together.
Figure 12:
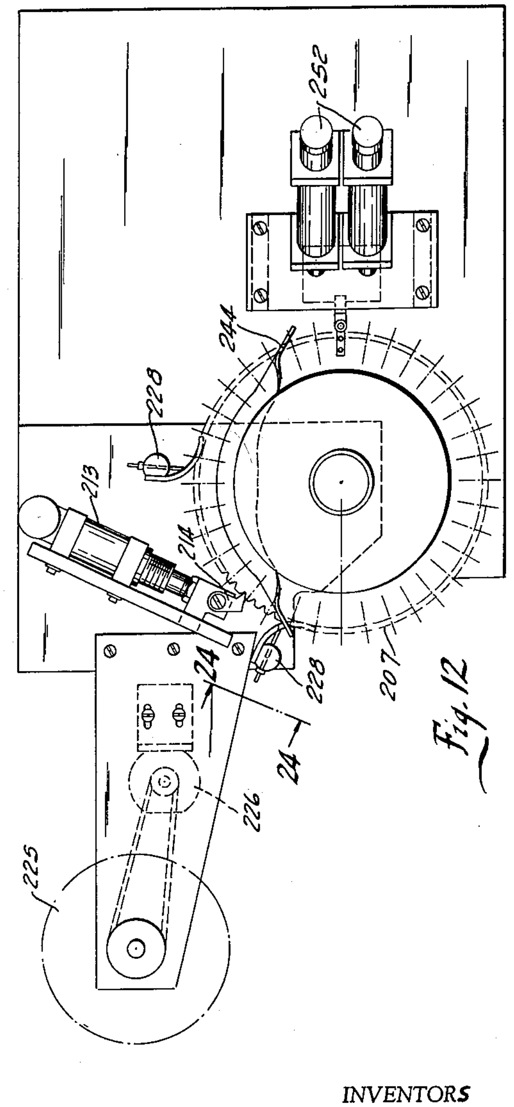
FIG. 12 is a plan view of the machine of FIGS. 10 and 11.

It will be understood that the cycling movements required at all stations are controlled by cam switches operatively similar to those described in FIG. 6 so that the magnetic valves of the air cylinders and the windings of the operating solenoids are energized at the correct time and for the correct length of time to keep the operations of the moving elements in sequence as described. The various cam switches control individual relays (not shown) which in turn open and close the circuits as is usual. It will also be understood that the air cylinders and the operating solenoids are equivalent means for securing reciprocating timed operation of various elements and may be substituted one for the other as desired.

We claim:

1. In the method of assembling preformed dielectric disks with plural conductive coatings thereon and wire terminals into completed capacitors, the steps of forming a pair of wires into straightened lengths at predetermined spacing to serve as terminals, mounting the pairs of terminals at predetermined longitudinal spacing from other pairs of terminals on a continuous tape coated with adhesive, the straightening and cutting of the wires and the mounting thereon of the tape occurring in timed sequence, delivering the disks individually from a mixed mass to a position with each conductive coating in contact with one terminal and soldering the terminals to the coatings, the delivery of the disks and soldering occurring in a timed sequence, removing grease from the soldered disks and terminals, forming bands of wax about each terminal for a portion of its length at predetermined spacing from the disk attached thereto, visually inspecting the soldered disk coating and terminal joints, bending downward out of the plane of the tape inadequately soldered disks, the waxing and inspection being under control of an operator, passing the tape adjacent a signalling station which is actuated by the bent-down disks to, in turn, energize a cutter for cutting such inadequately soldered disks off the tape, covering the remaining disks and the wax-banded portions of the terminals thereof with a moisture-proofing composition, setting and curing said composition to form a smooth covering of substantially uniform thickness on the disks, breaking off the covering of the terminals without disturbing the covering on the disks, stamping indicia on a first side of the disks, subjecting each capacitor to high voltage electric testing, reversing the tape and stamping indicia on the second side of the disks, cutting off the tape of the capacitors failing to withstand the test, and removing the completed capacitors from the tape, the tape being held taut for the step of breaking off the covering and all steps thereafter being performed in timed sequence.

2. In the method of assembling preformed dielectric disks with plural conductive coatings thereon and wire terminals into completed capacitors, the steps of passing a pair of wires from spools thereof through wire straightening means, bringing the wires to predetermined longitudinal spacing, cutting the wires to predetermined lengths to form pairs of terminals, mounting the pairs of terminals at predetermined longitudinal spacing from other pairs of terminals on a continuous tape coated with adhesive, the straightening and cutting of the wires and the mounting thereon of the tape occurring in timed sequence, delivering the disks individually from a mixed mass to a position with each conductive coating in contact with one terminal and soldering the terminals to the coatings, the delivery of the disks and soldering occurring in a timed sequence, removing grease from the soldered disks and terminals, forming bands of wax about each terminal for a portion of its length at predetermined spacing from the disk attached thereto, visually inspecting the soldered disk coating and terminal joints, bending downward out of the plane of the tape inadequately soldered disks, the waxing and inspection being under control of an operator, passing the tape adjacent a signalling station which is actuated by the bent-down disks to, in turn, energize a cutter for cutting such inadequately soldered disks off the tape, covering the remaining disks and the wax-banded portions of the terminals thereof with a moisture-proofing composition, setting and curing said composition to form a smooth covering of substantially uniform thickness on the disks, breaking off the covering of the terminals without disturbing the covering on the disks, stamping indicia on a first side of the disks, subjecting each capacitor to high voltage electric testing, reversing the tape and stamping indicia on the second side of the disks, cutting off the tape of the capacitors failing to withstand the test, and removing the completed capacitors from the tape, the tape being held taut for the step of breaking off the covering and all steps thereafter being performed in timed sequence.

3. In the method of assembling preformed dielectric disks with plural conductive coatings thereon and wire terminals into completed capacitors, the steps of forming a pair of wires into straightened lengths at predetermined spacing to serve as terminals, embedding the pairs of terminals in the adhesive coating on the tape and at right angle to the center line of the tape and with the ends in a line substantially parallel to the center line of the tape, the straightening and cutting of the wires and the mounting thereon of the tape occurring in timed sequence, delivering the disks individually from a mixed mass to a position with each conductive coating in contact with one terminal and soldering the terminals to the coatings, the delivery of the disks and soldering occurring in a timed sequence, removing grease from the soldered disks and terminals, forming bands of wax about each terminal for a portion of its length at predetermined spacing from the disk attached thereto, visually inspecting the soldered disk coating and terminal joints, bending downward out of the plane of the tape inadequately soldered disks, the waxing and inspection being under control of an operator, passing the tape adjacent a signalling station which is actuated by the bent-down disks to, in turn, energize a cutter for cutting such inadequately soldered disks off the tape, covering the remaining disks and the wax-banded portions of the terminals thereof with a moisture-proofing composition, setting and curing said composition to form a smooth covering of substantially uniform thickness on the disks, breaking off the covering of the terminals without disturbing the covering on the disks, stamping indicia on a first side of the disks, subjecting each capacitor to high voltage electric testing, reversing the tape and stamping indicia on the second side of the disks, cutting off the tape of the capacitors failing to withstand the test, and removing the completed capacitors from the tape, the tape being held taut for the step of breaking off the covering and all steps thereafter being performed in timed sequence.

4. In the method of assembling preformed dielectric disks with plural conductive coatings thereon and wire terminals into completed capacitors, the steps of forming a pair of wires into straightened lengths at predetermined spacing to serve as terminals, heating the pairs of terminals and pressing them into a thermosensitive adhesive on the tape, the terminals being positioned at right angles to the center line of the tape and with the ends parallel to the center line of the tape, the straightening and cutting of the wires and the mounting thereon of the tape occurring in timed sequence, delivering the disks individually from a mixed mass to a position with each conductive coating in contact with one terminal and soldering the terminals to the coatings, the delivery of the disks and soldering occurring in a timed sequence, removing grease from the soldered disks and terminals, forming bands of wax about each terminal for a portion of its length at predetermined spacing from the disk attached thereto, visually inspecting the soldered disk coating and terminal joints, bending downward out of the plane of the tape inadequately soldered disks, the waxing and inspection being under control of an operator, passing the tape adjacent a signalling station which is actuated by bent-down disks to, in turn, energize a cutter for cutting such inadequately soldered disks off the tape, covering the remaining disks and the wax-banded portions of the terminals thereof with a moisture-proofing composition, setting and curing said composition to form a smooth covering of substantially uniform thickness on the disks, breaking off the covering of the terminals without disturbing the covering on the disks, stamping indicia on a first side of the disks, subjecting each capacitor to high voltage electric testing, reversing the tape and stamping indicia on the second side of the disks, cutting off the tape of the capacitors failing to withstand the test, and removing the completed capacitors from the tape, the tape being held taut for the step of breaking off the covering and all steps thereafter being performed in timed sequence.

5. In the method of assembling preformed dielectric disks with plural conductive coatings thereon and wire terminals into completed capacitors, the steps of forming a pair of wires into straightened lengths at predetermined spacing to serve as terminals, mounting the pairs of terminals at predetermined longitudinal spacing from other pairs of terminals on a continuous tape coated with adhesive, the straightening and cutting of the wires and the mounting thereon of the tape occurring in timed sequence, delivering the disks individually from a mixed mass to a position with each conductive coating in contact with one terminal and soldering the terminals to the coatings, the delivery of the disks and soldering occurring in a timed sequence, removing grease from the soldered disks and terminals, turning the tape vertically edgewise and with the disks downward and passing the disks and portions of the terminals through a grease solvent, turning the tape back to horizontally edgewise position, forming bands of wax about each terminal for a portion of its length at predetermined spacing from the disk attached thereto, visually inspecting the soldered disk coating and terminal joints, bending downward out of the plane of the tape inadequately soldered disks, the waxing and inspection being under control of an operator, passing the tape adjacent a signalling station which is actuated by bent-down disks to, in turn, energize a cutter for cutting such inadequately soldered disks off the tape, covering the remaining disks and the wax-banded portions of the terminals thereof with a moisture-proofing composition, setting and curing said composition to form a smooth covering of substantially uniform thickness on the disks, breaking off the covering of the terminals without disturbing the covering on the disks, stamping indicia on a first side of the disks, subjecting each capacitor to high voltage electric testing, reversing the tape and stamping indicia on the second side of the disks, cutting off the tape of the capacitors failing to withstand the test, and removing the completed capacitors from the tape, the tape being held taut for the step of breaking off the covering and all steps thereafter being performed in timed sequence.

6. In the method of assembling preformed dielectric disks with plural conductive coatings thereon and wire terminals into completed capacitors, the steps of forming a pair of wires into straightened lengths at predetermined spacing to serve as terminals, mounting the pairs of terminals at predetermined longitudinal spacing from other pairs of terminals on a continuous tape coated with adhesive, the straightening and cutting of the wires and the mounting thereon of the tape occurring in timed sequence, delivering the disks individually from a mixed mass to a position with each conductive coating in contact with one terminal and soldering the terminals to the coatings, the delivery of the disks and soldering occurring in a timed sequence, removing grease from the soldered disks and terminals, forming bands of wax about each terminal for a portion of its length at pre-determined spacing from the disk attached thereto, visually inspecting the soldered disk coating and terminal joints, bending downward out of the plane of the tape inadequately soldered disks, the waxing and inspection being under control of an operator, passing the tape adjacent a signalling station which is actuated by the bent-down disks to, in turn, energize a cutter for cutting such inadequately soldered disks off the tape, turning the tape vertically edgewise with the disks downward and passing the disks and a portion of the terminals through a resinous waterproof covering material, setting and curing said composition to form a smooth covering of substantially uniform thickness on the disks, breaking off the covering of the terminals without disturbing the covering on the disks, stamping indicia on a first side of the disks, subjecting each capacitor to high voltage electric testing, reversing the tape and stamping indicia on the second side of the disks, cutting off the tape of the capacitors failing to withstand the test, and removing the completed capacitors from the tape, the tape being held taut for the step of breaking off the covering and all steps thereafter being performed in timed sequence.

7. In the method of assembling preformed dielectric disks with plural conductive coatings thereon and wire terminals into completed capacitors, the steps of forming a pair of wires into straightened lengths at predetermined spacing to serve as terminals, mounting the pairs of terminals at predetermined longitudinal spacing from other pairs of terminals on a continuous tape coated with adhesive, the straightening and cutting of the wires and the mounting thereon of the tape occurring in timed sequence, delivering the disks individually from a mixed mass to a position with each conductive coating in contact with one terminal and soldering the terminals to the coatings, the delivery of the disks and soldering occurring in a timed sequence, removing grease from the soldered disks and terminals, forming bands of wax about each terminal for a portion of its length at predetermined spacing from the disk attached thereto, visually inspecting the soldered disk coating and terminal joints, bending downward out of the plane of the tape inadequately soldered disks, the waxing and inspection being under control of an operator, passing the tape adjacent a signalling station which is actuated by the bent-down disks to, in turn, energize a cutter for cutting such inadequately soldered disks off the tape, covering the remaining disks and the wax-banded portions of the terminals thereof with a moisture-proofing composition, setting and curing said composition to form a smooth covering of substantially uniform thickness on the disks, positioning the disks with the covered portions of the terminals between reciprocating hammers and actuating the hammers to break off the covering material of the terminals without disturbing the covering on the disks, stamping indicia on a first side of the disks, subjecting each capacitor to high voltage electric testing, reversing the tape and stamping indicia on the second side of the disks, cutting off the tape of the capacitors failing to withstand the test, and removing the completed capacitors from the tape, the tape being held taut for the step of breaking off the covering and all steps thereafter being performed in timed sequence.

8. In the method of assembling preformed dielectric discs with plural conductive coatings thereon and wire terminals into completed capacitors, the steps of forming a pair of wires of predetermined length into terminals, applying said terminals to a continuous adhesive tape in separated sets and adhering said terminals to said tape, presenting discs individually to said sets of terminals in timed sequence relative to the delivery of the terminals on said tape, a disc corresponding to each pair of terminals applied to the tape, soldering conductive coatings on each of the discs to respective terminals in the respective set of terminals, coating the discs and adjacent terminal portions with a covering material and curing the covering material on the discs to present a finished capacitor.

9. In the method of assembling preformed dielectric discs with plural conductive coatings thereon and wire terminals into completed capacitors, the steps of placing pairs of straight wires on an adhesive tape by adhesion, continuously moving the tape carrying the pairs of wires, presenting conductively coated discs in single file to said pairs of terminals at a given point and inserting disks individually between said pairs of terminals so that each of a pair of the terminals bears on one of the conductive coatings on a disc, permanently attaching said pairs of terminals to a respective conductive coat on its respective discs, moving the terminals and the attached discs with the tape and coating the outside of the discs with a covering material, and air drying the covering material on the discs to provide a completed capacitor.

10. In the method of assembling preformed dielectric discs with plural conductive coatings thereon and wire terminals into completed capacitors, the steps of adhering pairs of straight wires to a continuous adhesive tape, attaching each of said pairs of straight wires to a dielectric disc with conductive coatings in timed sequence, advancing the tape stepwise with the tape taut to provide for timed attachment of discs to the respective sets of terminals, coating the discs with a covering material, and curing the covering material on the discs to form a finished capacitor.

11. In the method of assembling preformed dielectric discs with plural conductive coatings thereon and wire terminals into completed capacitors, the steps of attaching a pair of wire terminals to an adhesive tape, attaching in timed sequence a preformed dielectric disc to each pair of wire terminals with each terminal attached to a respective conductive coating of the respective disc, degreasing the disc coatings and adjacent areas of the wire terminals by dipping into a grease solvent, applying bands of wax about the wire terminals at a point spaced from the disc edges, coating the discs and the attached wire terminals with a covering material, and curing the material to provide a finished capacitor.

12. In the method of claim 11 the step of breaking off excess coated resin from the terminals at the wax bands.

13. In the method of assembling preformed dielectric discs with plural conductive coatings thereon and wire terminals into completed capacitors, the steps of feeding a pair of wires to a tape, mounting the wires on the tape to extend in a common plane at right angles to the centerline of the tape, securing the wires by a thermoplastic adhesive on the tape surface, heating and pressing the terminals into the adhesive, feeding coated discs in a timed sequence to the terminals mounted on the tape, joining the conductive coatings of the disc to the terminals, turning the tape edgewise to vertical position, degreasing the discs and terminals, returning the tape to a horizontal arrangement, waxing portions of the terminals, visually inspecting the terminal-disk joint and bending improperly joined disks out of plane of the properly joined disks, detecting capacitors bent out of plane and cutting off said detected capacitors, turning the tape to a vertical arrangement, applying a moisture proof covering a liquid resin over the entire disc and the terminals no further than the wax bands, changing the position and direction of the tape movement to avoid resin flow, and setting and curing the covering resin to present a finished capacitor.

14. In the method of assembling preformed dielectric discs wtih plural conductive coatings thereon and wire terminals into completed capacitors, the steps of passing wire through straightening means, bringing the wire to predetermined longitudinal distance, cutting the wire to predetermined lengths for forming pairs of terminals, mounting the pairs of terminals at predetermined spacing from other pairs of terminals longitudinally of a continuous tape coated with adhesive, advancing the tape and the terminals, presenting the discs individually to said pairs of terminals in timed sequence, attaching conductive coatings on each of the discs to respective terminals in the respective pairs, coating the discs and adjacent terminal ends with a covering material and curing the covering material to present a finished capacitor.

15. In the method of assembling into completed capacitors wire terminals and preformed dielectric disks with plural conductive coatings thereon, the steps of forming a pair of wires into terminals of a given length, applying the terminals to an adhesively coated tape, presenting the disks individually in timed sequence at a given position to bring a coating on a disk adjacent a terminal, conductively attaching each terminal to its respective disk coating, degreasing the coated disks and portions of the terminals attached to and adjacent to the coatings, covering the disks and portions of the terminals with a liquid resin, moving the tape with the coated disks thereon to maintain uniformity in thickness of the resin covering until the same is solidified, and removing the capacitors from the tape.

16. In the method of assembling into completed capacitors wire terminals and preformed dielectric disks with plural conductive coatings thereon, the steps of straightening a pair of wires in parallel relation at a given spacing, feeding the pair of wires in spaced parallel relation adjacent a thermoplastic adhesive coated tape, holding and cutting the wires to a given length, heating and pressing the wires into the adhesive on the tape, advancing the tape stepwise through a given position, feeding the disks individually from a mixed mass thereof and in timed sequence in said given position to bring each coating of a disk adjacent a terminal, soldering each terminal to its respective disk coating by dipping thereof into molten solder, passing the tape with the capacitors thereon through a solvent for grease, applying bands of wax about the wire terminals at a point spaced from the disk edges, cutting inadequately soldered disks from the terminals thereof, covering the disks and wax banded portions of the terminals with a liquid resin, curing the resin to solid form, and removing the capacitors from the tape.

17. In the method of assembling wire terminals and preformed dielectric disks with plural conductive coatings thereon into completed capacitors, the steps of straightening a pair of wires in parallel relation at a given spacing, feeding the pair of wires in spaced parallel relation to other pairs of wires adjacent a thermoplastic adhesive coated tape, holding and cutting the wires to a given length, heating and pressing the wires into the adhesive on the tape as the tape is advanced in steps to space pairs of wires at given distance from other pairs of wires, the pairs of wires being pressed on the tape at right angle to the center line thereof and extending from the edges of the tape, feeding the disks individually from a mixed mass thereof in timed sequence into said given position to bring each coating of a disk adjacent a terminal, soldering each terminal to its respective disk coating by dipping thereof into molten solder, passing the capacitors while on the tape through a solvent for grease and wax, cutting the inadequately soldered disks from the terminals thereof, and cutting the completed capacitors off the tape.

References Cited in the file of this patent

UNITED STATES PATENTS

| | | |
|---|---|---|
| 767,465 | Wirth et al. | Aug. 16, 1904 |
| 1,619,406 | Emmert | Mar. 1, 1927 |
| 1,717,243 | Nauk | June 11, 1929 |
| 1,926,842 | Dubilier | Sept. 12, 1933 |
| 1,939,883 | Edwards et al. | Dec. 19, 1933 |
| 2,089,564 | Magidson | Aug. 10, 1937 |
| 2,101,860 | Lewis et al. | Dec. 14, 1937 |
| 2,387,759 | Jarvis | Oct. 30, 1945 |
| 2,427,417 | Prickett | Sept. 16, 1947 |
| 2,766,510 | Heibel | Oct. 16, 1956 |
| 2,929,130 | Packman | Mar. 22, 1960 |
| 2,953,840 | Freeburg | Sept. 27, 1960 |